United States Patent
Lee et al.

(10) Patent No.: US 11,070,806 B2
(45) Date of Patent: Jul. 20, 2021

(54) METHOD AND APPARATUS FOR PERFORMING LOW COMPLEXITY COMPUTATION IN TRANSFORM KERNEL FOR VIDEO COMPRESSION

(71) Applicants: LG ELECTRONICS INC., Seoul (KR); INDUSTRY-ACADEMIC COOPERATION FOUNDATION CHOSUN UNIVERSITY, Gwangju (KR)

(72) Inventors: Bumshik Lee, Gwangju (KR); Moonmo Koo, Seoul (KR); Jaehyun Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/627,107

(22) PCT Filed: Jun. 28, 2018

(86) PCT No.: PCT/KR2018/007351
§ 371 (c)(1),
(2) Date: Apr. 3, 2020

(87) PCT Pub. No.: WO2019/004749
PCT Pub. Date: Jan. 3, 2019

(65) Prior Publication Data
US 2020/0322604 A1    Oct. 8, 2020

Related U.S. Application Data

(60) Provisional application No. 62/611,545, filed on Dec. 29, 2017, provisional application No. 62/611,544, (Continued)

(51) Int. Cl.
*H04N 19/176* (2014.01)
*H04N 19/61* (2014.01)
(Continued)

(52) U.S. Cl.
CPC .......... *H04N 19/12* (2014.11); *H04N 19/176* (2014.11); *H04N 19/61* (2014.11); *H04N 19/625* (2014.11)

(58) Field of Classification Search
CPC ............................ H04N 19/12; H04N 19/176
See application file for complete search history.

(56) References Cited

U.S. PATENT DOCUMENTS

| 8,989,796 | B2* | 3/2015 | Asaoka | H04W 52/367 455/522 |
| 9,979,967 | B2* | 5/2018 | Lee | H04N 19/593 |

(Continued)

FOREIGN PATENT DOCUMENTS

| KR | 10-20120046725 A | 5/2012 |
| KR | 10-20140119823 A | 10/2014 |

(Continued)

*Primary Examiner* — Irfan Habib
(74) *Attorney, Agent, or Firm* — Dentons US LLP

(57) ABSTRACT

The present disclosure relates to a method for processing a video signal by using a linear relationship between transform types, comprising the steps of: determining a transform group on the basis of a prediction mode of a current block; parsing a transform combination index from a video signal, wherein the transform combination index indicates anyone of a plurality of transform combinations in the transform group; deriving a transform combination corresponding to the transform combination index, wherein the transform combination consists of a horizontal transform and a vertical transform, and includes DST-7 or DCT-8; performing inverse transform on the current block on the basis of the transform combination; and restoring the video signal by using the inverse transformed current block.

12 Claims, 20 Drawing Sheets

Related U.S. Application Data filed on Dec. 29, 2017, provisional application No. 62/526,337, filed on Jun. 28, 2017.

(51) Int. Cl.
*H04N 19/12* (2014.01)
*H04N 19/625* (2014.01)

(56) References Cited

U.S. PATENT DOCUMENTS

| | | | |
|---|---|---|---|
| 10,326,990 B2* | 6/2019 | An | H04N 19/12 |
| 10,531,123 B2* | 1/2020 | Kim | H04N 19/159 |
| 2012/0008675 A1* | 1/2012 | Karczewicz | H04N 19/61 |
| | | | 375/240.02 |
| 2012/0201300 A1* | 8/2012 | Kim | H04N 19/176 |
| | | | 375/240.12 |
| 2012/0301040 A1* | 11/2012 | Yie | H04N 19/122 |
| | | | 382/233 |
| 2012/0307893 A1* | 12/2012 | Reznik | G10L 19/0212 |
| | | | 375/240.12 |
| 2013/0065516 A1* | 3/2013 | Asaoka | H04W 24/02 |
| | | | 455/25 |
| 2014/0198848 A1* | 7/2014 | Yie | H04N 19/176 |
| | | | 375/240.13 |
| 2016/0219290 A1* | 7/2016 | Zhao | H04N 19/60 |
| 2017/0026644 A1* | 1/2017 | Lee | H04N 19/625 |
| 2017/0188029 A1* | 6/2017 | An | H04N 19/157 |
| 2018/0020218 A1* | 1/2018 | Zhao | H04N 19/176 |
| 2018/0041776 A1* | 2/2018 | Kim | H04N 19/122 |
| 2018/0205949 A1* | 7/2018 | Hsiang | H04N 19/12 |
| 2020/0260078 A1* | 8/2020 | Zhao | H04N 19/61 |
| 2020/0304794 A1* | 9/2020 | Lai | H04N 19/30 |
| 2020/0322636 A1* | 10/2020 | Egilmez | H04N 19/91 |

FOREIGN PATENT DOCUMENTS

| | | |
|---|---|---|
| WO | 2015-172694 A1 | 11/2015 |
| WO | 2016-143991 A1 | 9/2016 |

* cited by examiner

[FIG. 1]
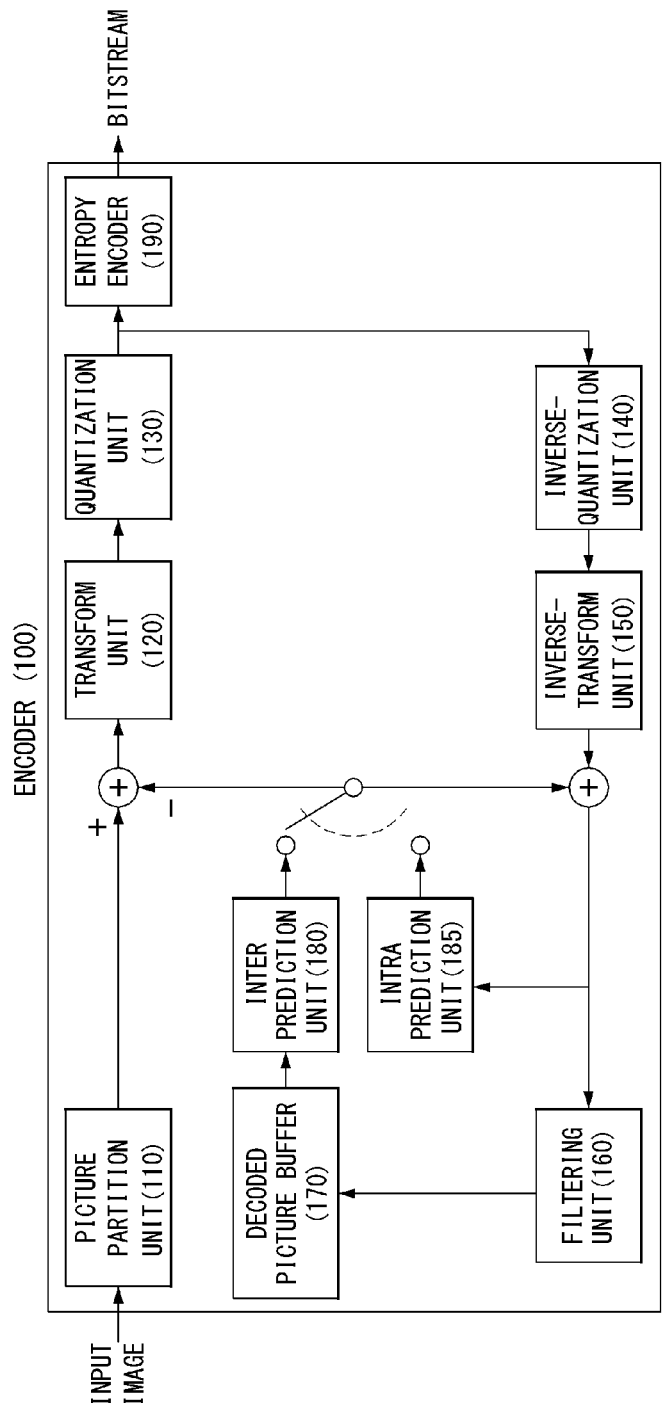

[FIG. 2]
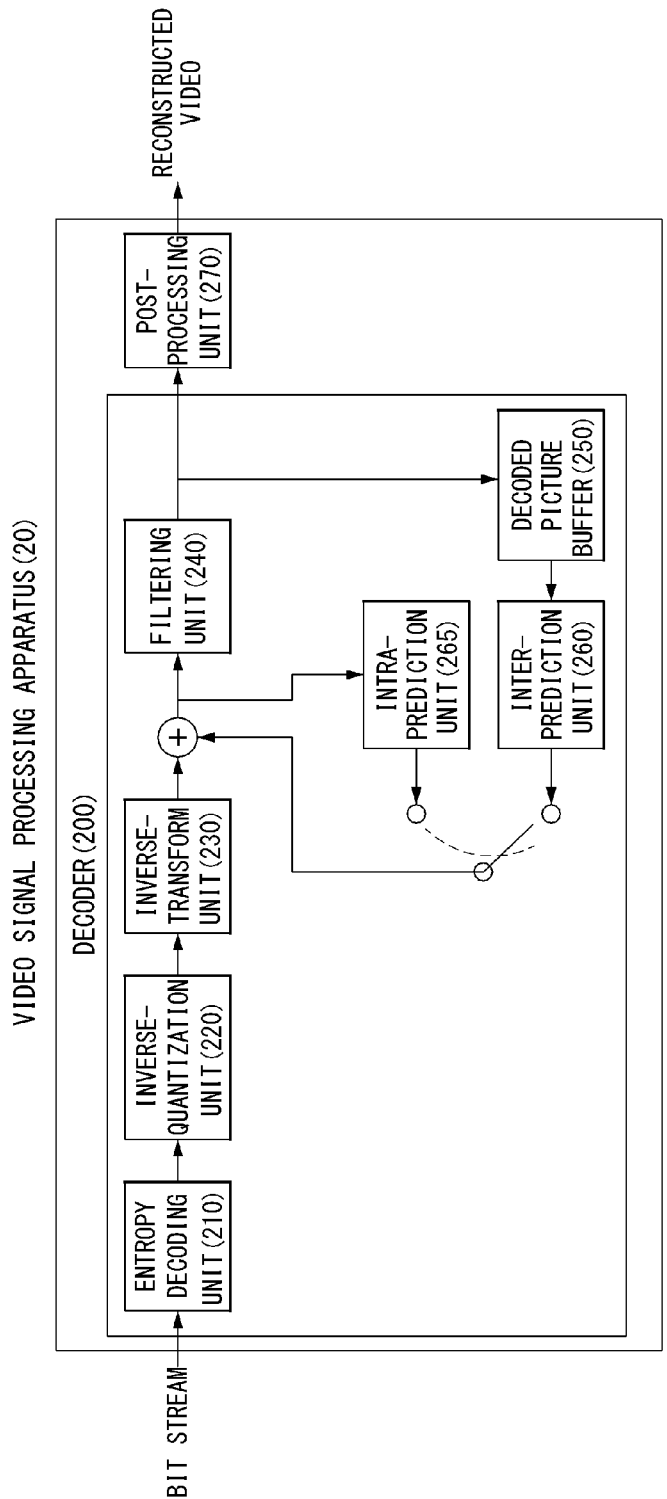

[FIG. 3]

| Configuration group | | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT8 | | |
| | 3 | DCT8 | DCT8 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[FIG. 4]
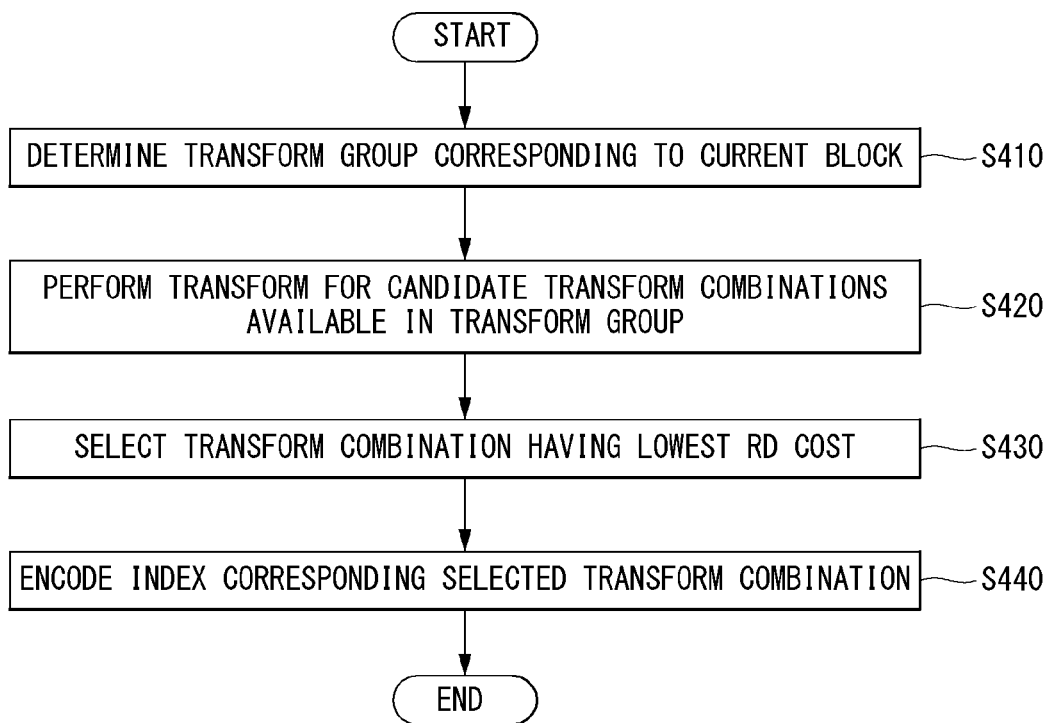

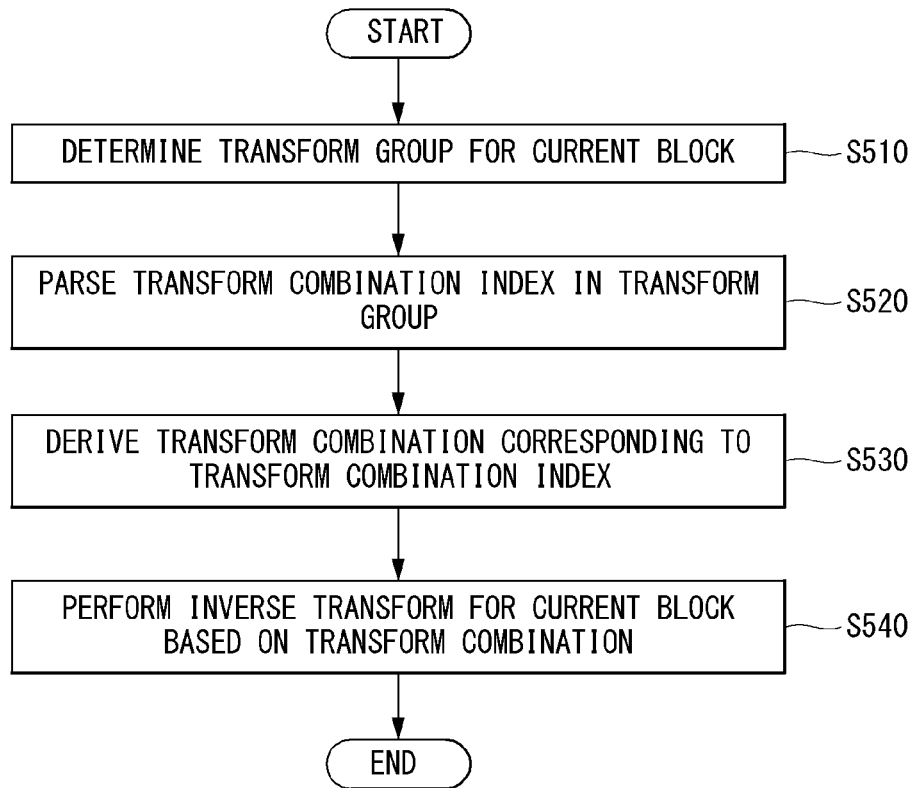
[FIG. 5]

[FIG. 6]
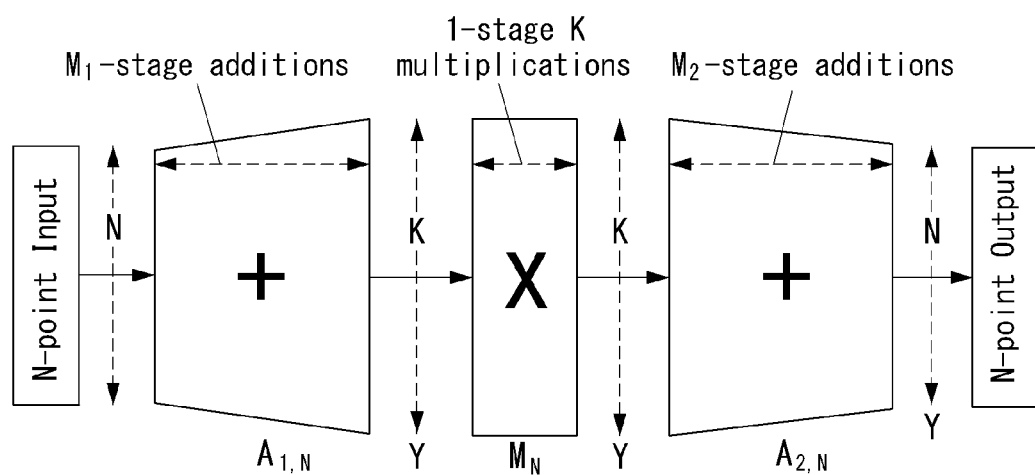

[FIG. 7]
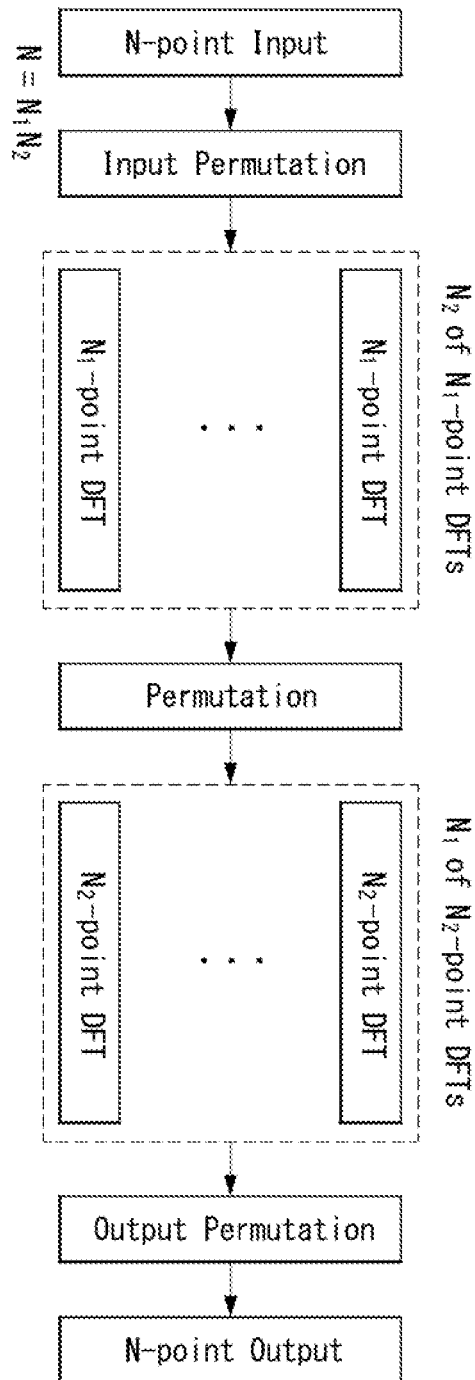

[FIG. 8]
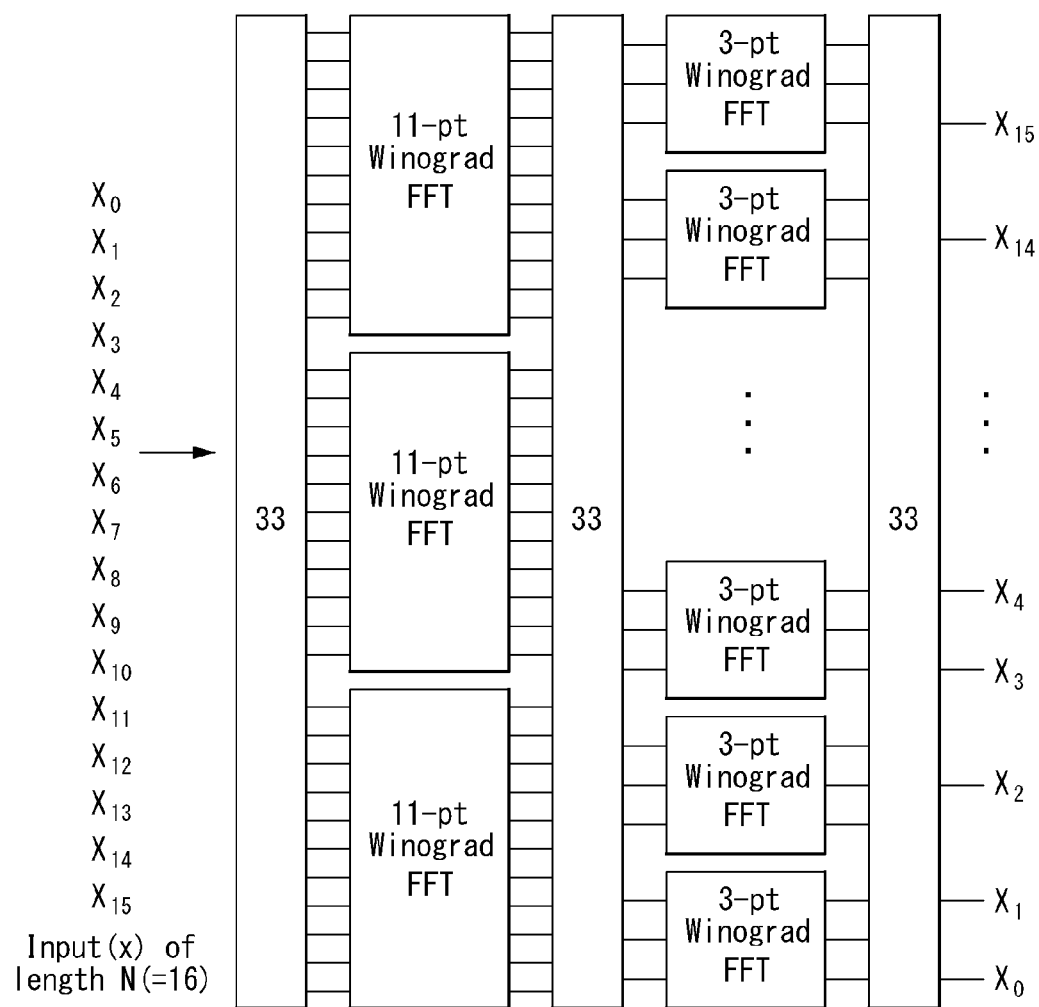

[FIG. 9]
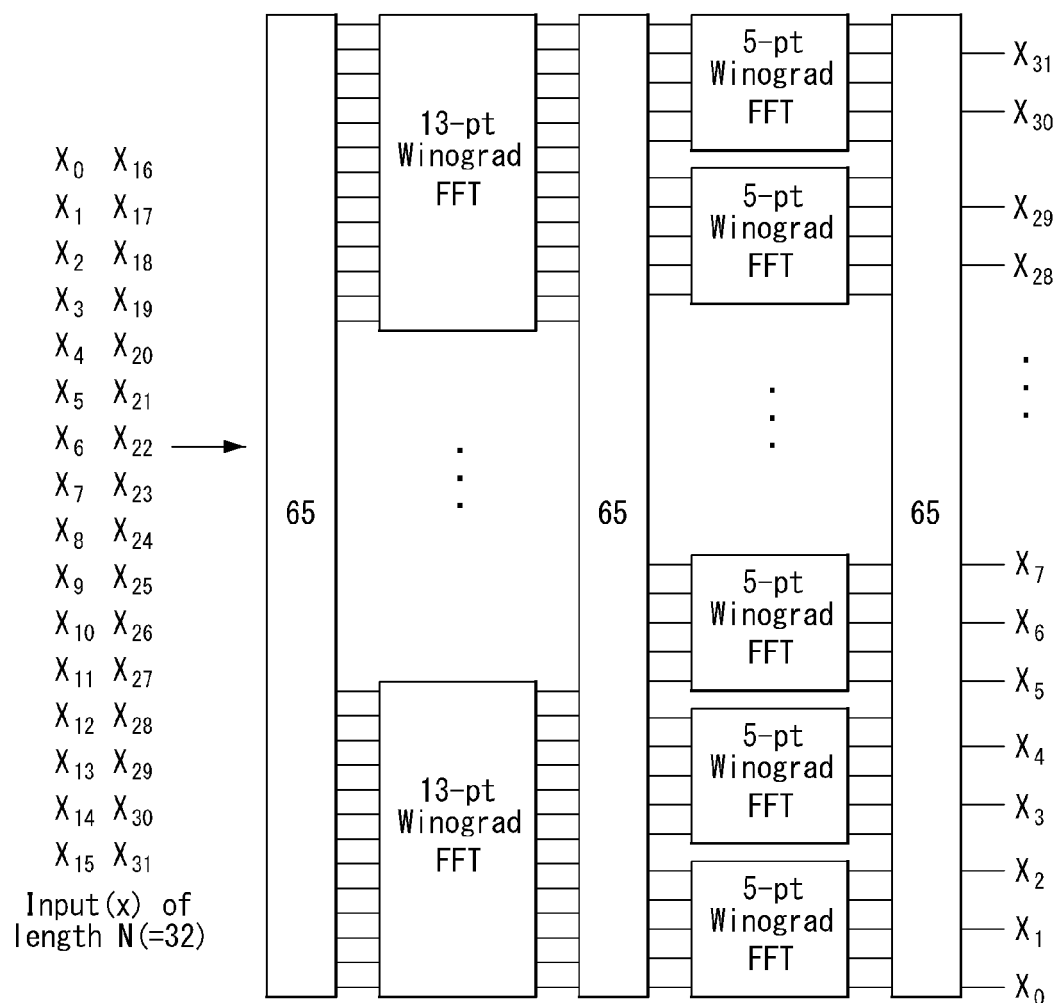

[FIG. 10]
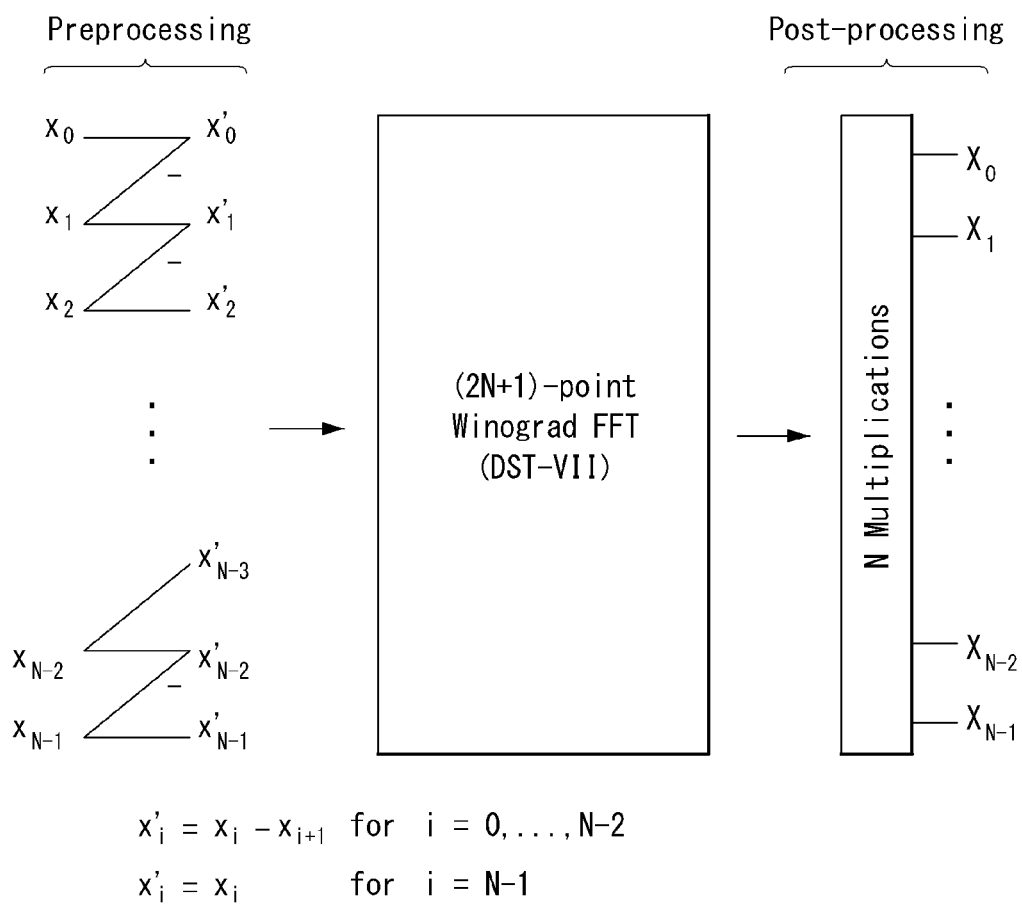

[FIG. 11]
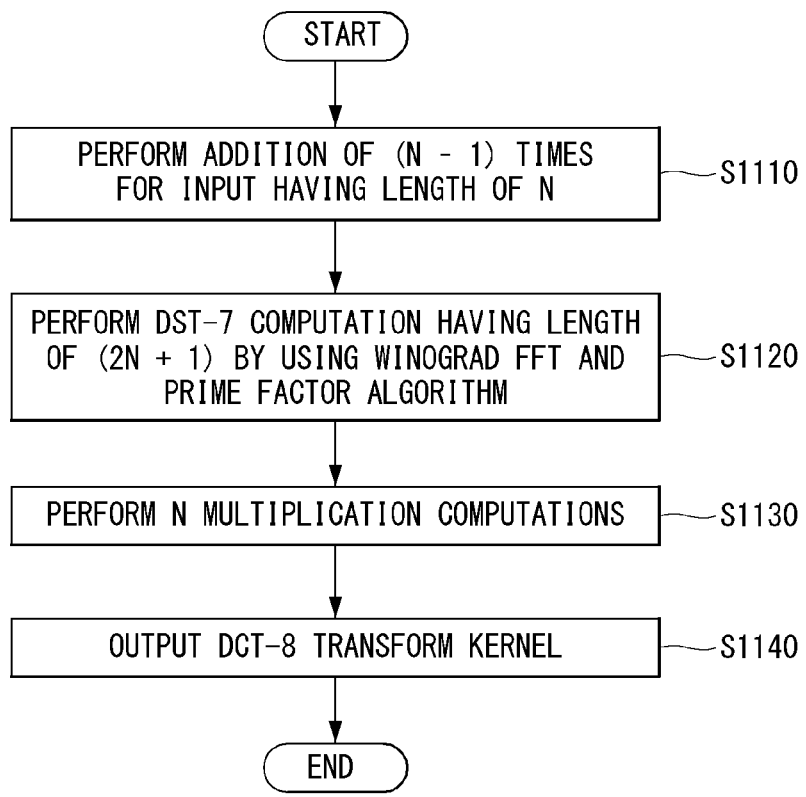

[FIG. 12]
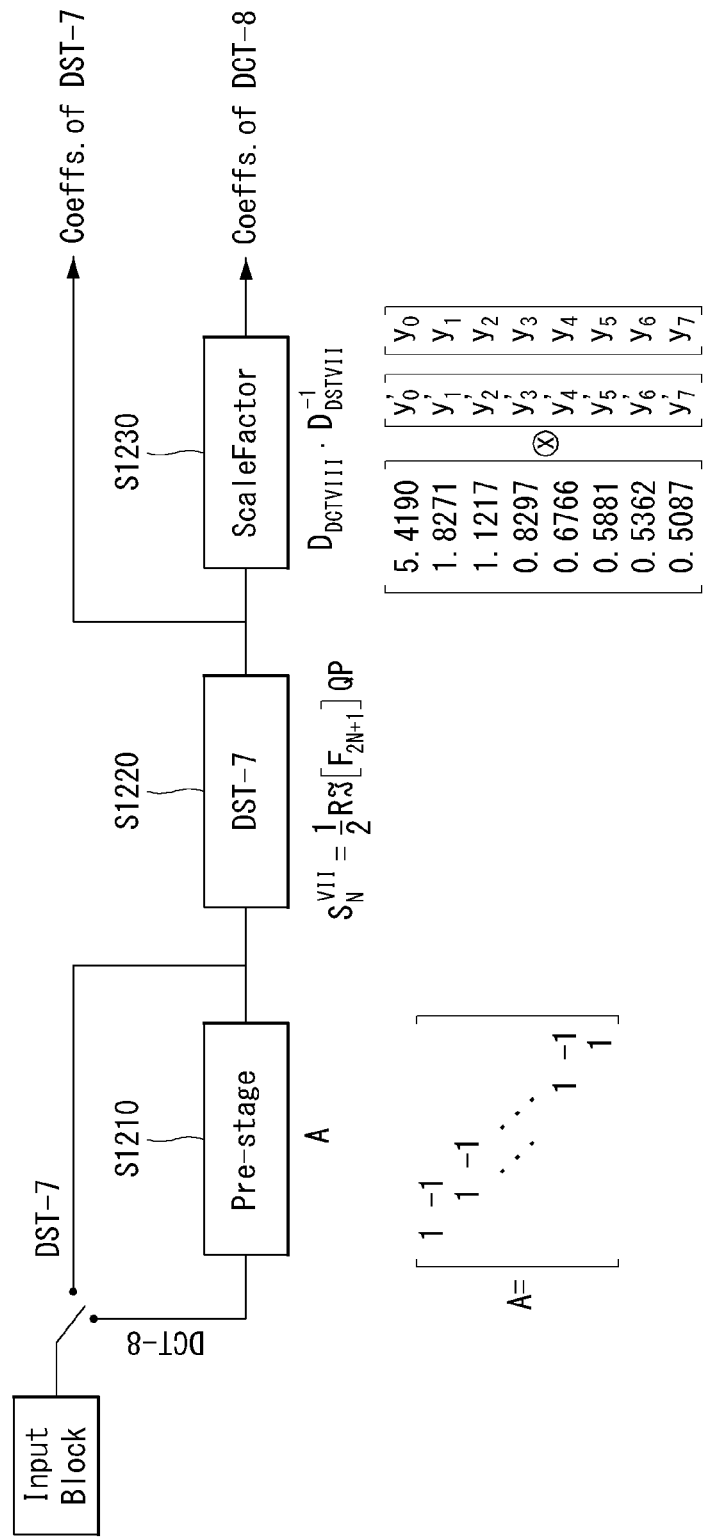

[FIG. 13]
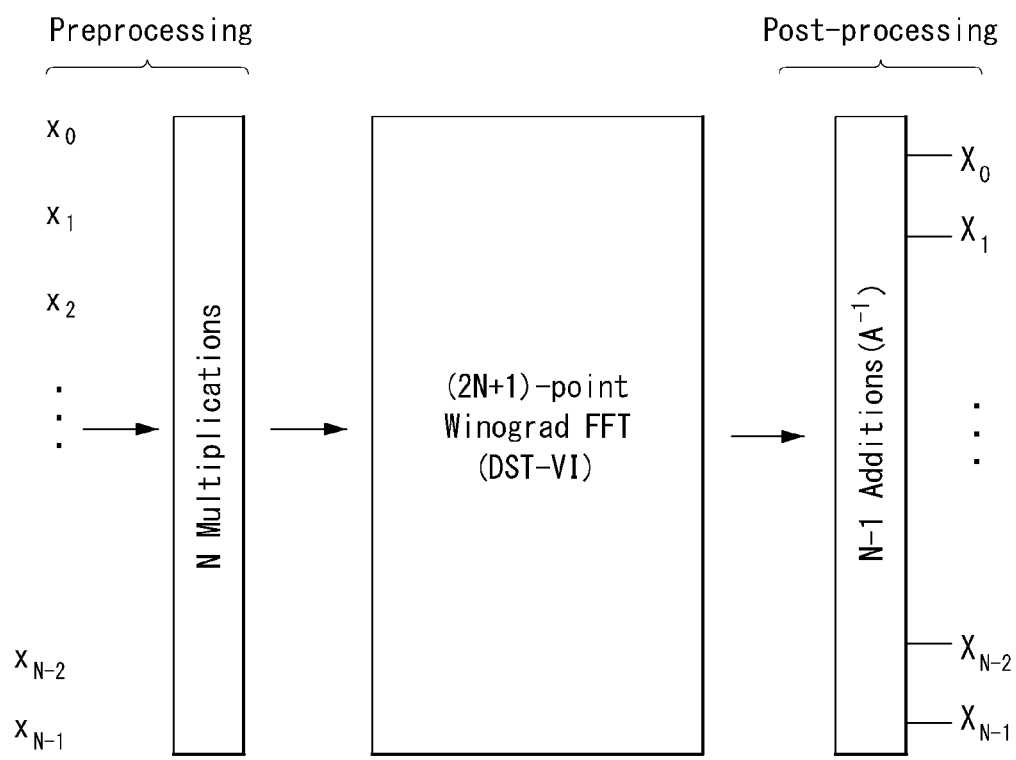

[FIG. 14]
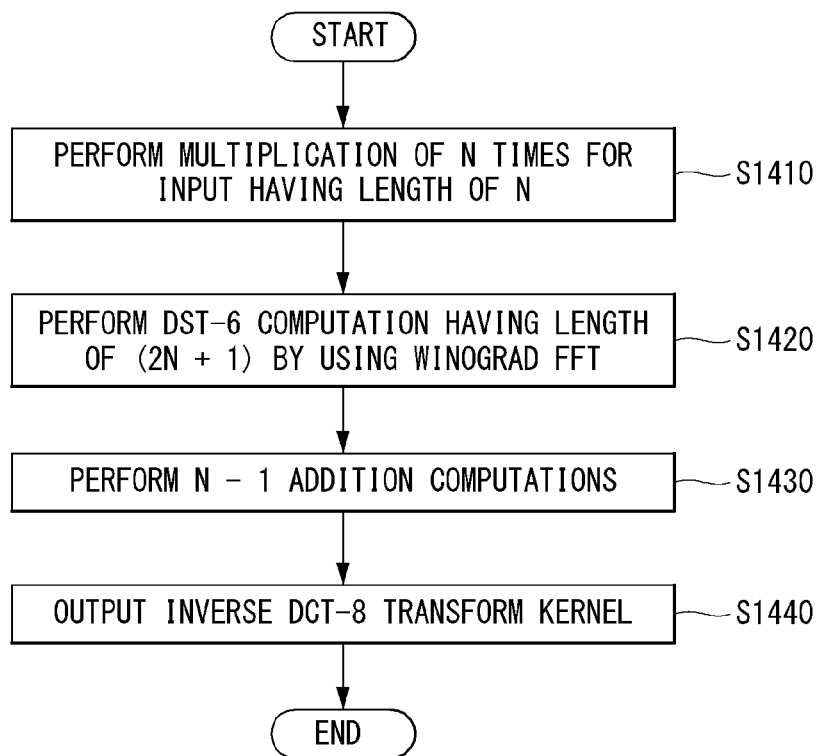

[FIG. 15]
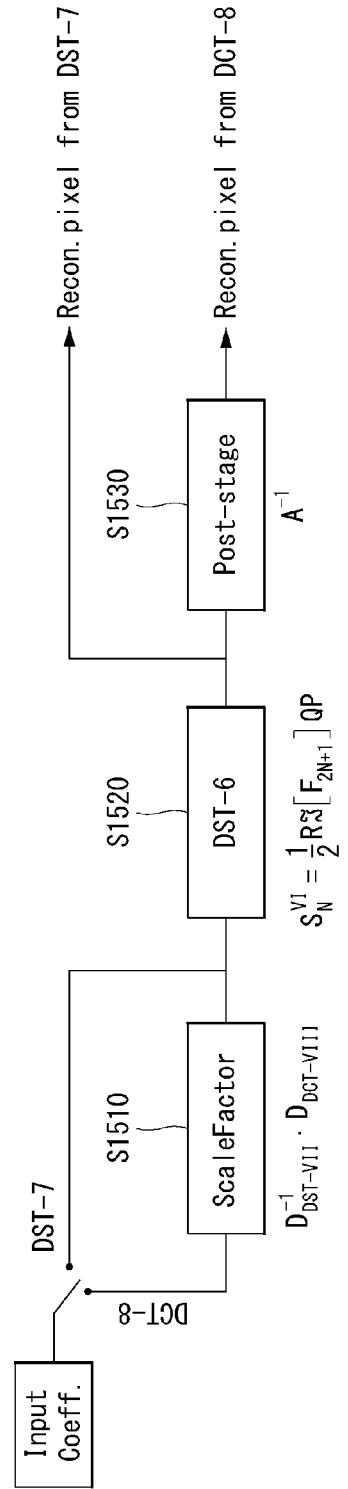

[FIG. 16]
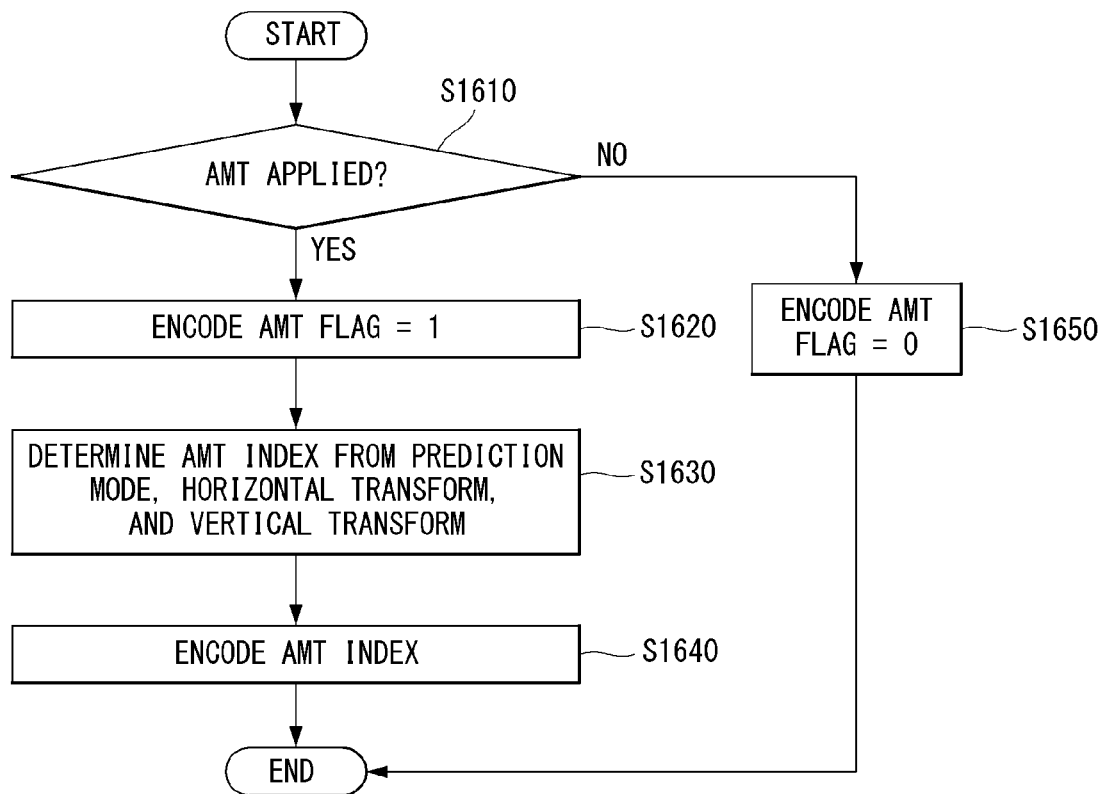

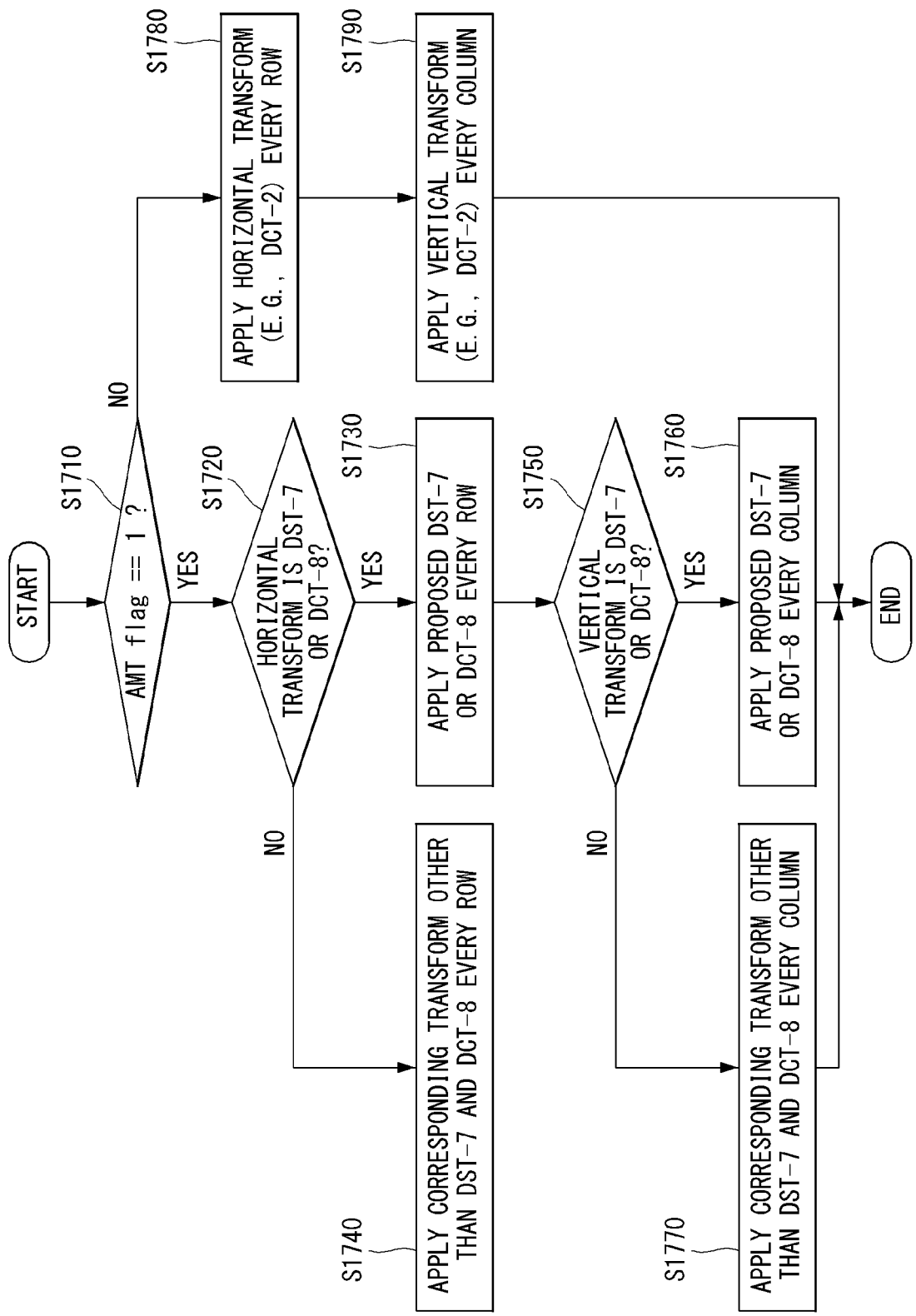
[FIG. 17]

[FIG. 18]
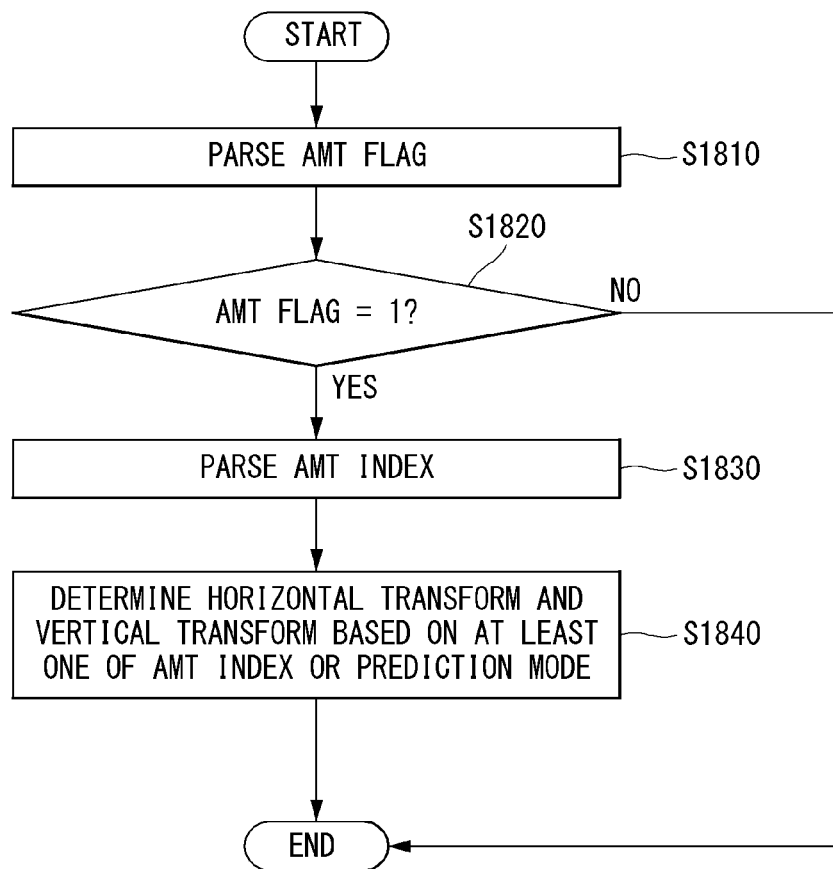

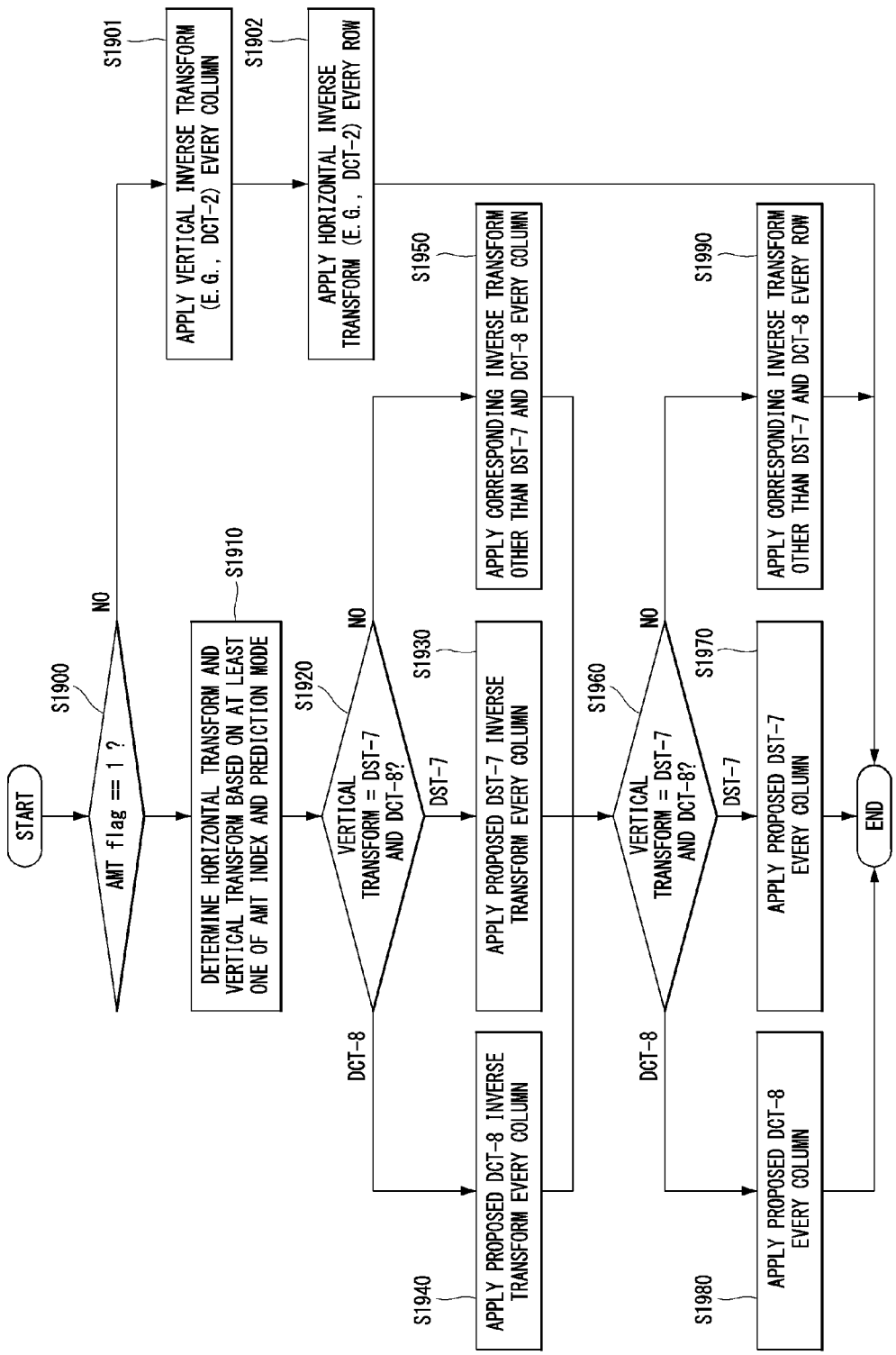
[FIG. 19]

[FIG. 20]
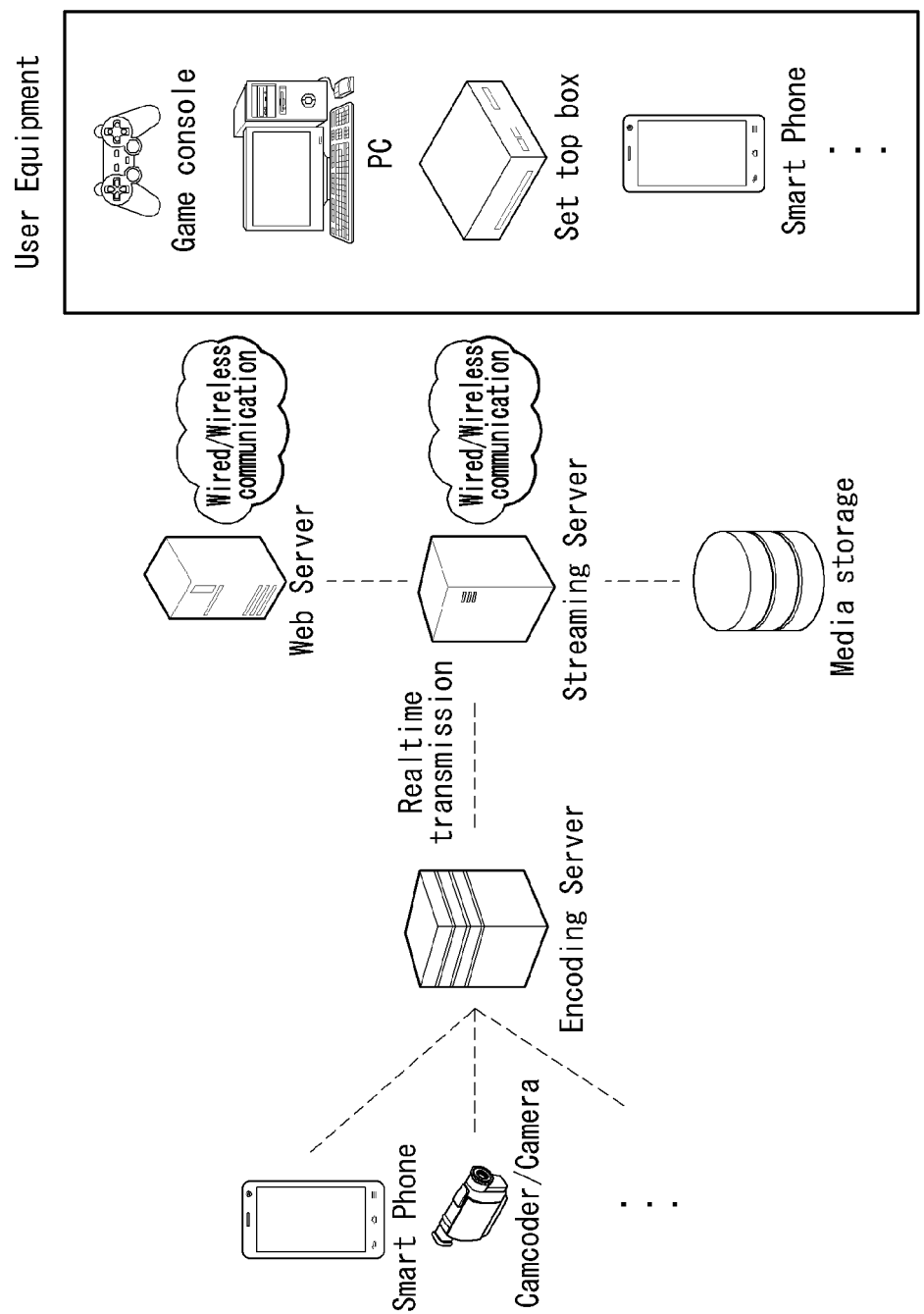

METHOD AND APPARATUS FOR PERFORMING LOW COMPLEXITY COMPUTATION IN TRANSFORM KERNEL FOR VIDEO COMPRESSION

CROSS-REFERENCE TO RELATED APPLICATIONS

The present application is the National Stage filing under 35 U.S.C. 371 of International Application No. PCT/KR2018/007351, filed on Jun. 28, 2018, which claims the benefit of U.S. Provisional Applications, No. 62/526,337 filed on Jun. 28, 2017, No. 62/611,545 filed on Dec. 29, 2017, No. 62/611,544 filed on Dec. 29, 2017, the contents of which are all hereby incorporated by reference herein in their entirety.

TECHNICAL FIELD

The present disclosure relates to a method and an apparatus for processing a video signal, and more particularly, to a technology for reducing computation for Discrete Sine Transform-7 (DST-7) and Discrete Cosine Transform-8 (DST-8) among transform kernels for video compression.

BACKGROUND ART

Next-generation video content will have characteristics of high spatial resolution, a high frame rate, and high dimensionality of scene representation. In order to process such content, it will lead to a tremendous increase in terms of memory storage, a memory access rate, and processing power.

Therefore, there is a need to design a new coding tool for processing the next-generation video contents more efficiently. In particular, when transform is applied, there is a need to design more efficient transform in terms of coding efficiency and complexity. For example, in the case of DST-7 and DCT-8, there is a situation in which a fast computation algorithm does not exist and complexity thereof is very large at present. Accordingly, a technique for low-complexity computation is required.

DISCLOSURE

Technical Problem

The present disclosure provides a low-complexity computation algorithm, for a transform kernel for video compression.

The present disclosure provides a method for reducing computation for Discrete Sine Transform-7 (DST-7) and Discrete Cosine Transform-8 (DST-8) among transform kernels for video compression.

The present disclosure provides an encoder/decoder structure for reflecting a new transform design.

Technical Solution

The present disclosure provides a method for reducing complexity and enhancing coding efficiency through a new transform design.

The present disclosure provides a method in which DCT-2 expressed by an integer uses a butterfly structure to perform transform with smaller complexity than the existing matrix computation.

The present disclosure provides a low-complexity computation algorithm having a length of N by using a Cooley-Turkey algorithm and a Rader algorithm for an FFT computation.

The present disclosure provides a method of using the Cooley-Turkey algorithm and the Rader algorithm for FFT-9, FFT-17, FFT-33, FFT-65, and FFT-129 computations based on a fact that DST-7 having a length of N has a relationship with FFT having a length of (2N+1).

The present disclosure provides a low-complexity computation algorithm of a DCT-8 transform kernel by using the relationship between DCT-8 and DST-7.

Advantageous Effects

According to the present disclosure, a number of computations can be reduced in multiplication through a low-complexity computation algorithm, for DST-7 and DCT-8. As a result, addition increases and complexity of an addition computation may increase as compared with the existing matrix computation, but in this case, as a length increases, an effect thereof is relatively reduced, and as a result, both the addition and multiplication are reduced as compared with a matrix computation.

In particular, a multiplication computation amount which gives a large influence on total computation complexity can be significantly reduced and a computation complexity result is a result in which a middle value is 0 or a process which may not be included in the computation is not excluded, thereby reducing actual computation complexity.

As described above, the total computation complexity of a new low-complexity computation algorithm can be significantly enhanced.

DESCRIPTION OF DRAWINGS

FIG. 1 is a schematic block diagram of an encoder in which encoding of a video signal is performed as an embodiment to which the present disclosure is applied.

FIG. 2 is a schematic block diagram of a decoder in which decoding of a video signal is performed as an embodiment to which the present disclosure is applied.

FIG. 3 is a table showing a transform configuration group to which Adaptive Multiple Transforms (AMT) is applied as an embodiment to which the present disclosure is applied.

FIG. 4 is a flowchart showing an encoding process in which Adaptive Multiple Transforms (AMT) is performed as an embodiment to which the present disclosure is applied.

FIG. 5 is a flowchart showing a decoding process in which Adaptive Multiple Transforms (AMT) is performed as an embodiment to which the present disclosure is applied.

FIG. 6 is a block diagram illustrating a process of applying Winograd FFT having a prime length of N for a DST-7 low-complexity computation as an embodiment to which the present disclosure is applied.

FIG. 7 is a block diagram illustrating a process of applying Prime Factor FFT having a length of N for a DST-7 low-complexity computation as an embodiment to which the present disclosure is applied.

FIGS. 8 and 9 are diagrams illustrating a process of performing a DST-7 low-complexity computation for N=16 and 32 by using Winograd FFT and Prime Factor FFT as embodiments to which the present disclosure is applied.

FIGS. 10 and 11 are a graph and a flowchart of performing a low-complexity computation of forward DCT-8 for a length of N as embodiments to which the present disclosure is applied.

FIG. 12 is an internal block diagram of an apparatus of performing a low-complexity computation of DCT-8 and DST-7 as an embodiment to which the present disclosure is applied.

FIGS. 13 and 14 are a graph and a flowchart of performing a low-complexity computation of backward DCT-8 for a length of N as embodiments to which the present disclosure is applied.

FIG. 15 is an internal block diagram of an apparatus of performing backward transform by using a relationship between DCT-8 and DST-7 as an embodiment to which the present disclosure is applied.

FIG. 16 is a flowchart for describing a process of encoding an AMT flag and an AMT index as an embodiment to which the present disclosure is applied.

FIG. 17 is a flowchart for describing an encoding process of applying DST-7 or DCT-8 to a row or a column as an embodiment to which the present disclosure is applied.

FIG. 18 is a flowchart for describing a decoding process in which horizontal transform or vertical transform is applied to a row or a column based on an AMT flag and an AMT index as an embodiment to which the present disclosure is applied.

FIG. 19 is a flowchart for describing a decoding process of applying DST-7 or DCT-8 to a row or a column as an embodiment to which the present disclosure is applied.

FIG. 20 is a structure diagram of a content streaming system as an embodiment to which the present disclosure is applied.

BEST MODE

The present disclosure provides a method for processing a video signal using a linear relationship between transform types, which includes: determining a transform group based on a prediction of a current block; parsing a transform combination index from the video signal, wherein the transform combination index indicates one of a plurality of transform combinations in the transform group; deriving a transform combination corresponding to the transform combination index, wherein the transform combination is composed of a horizontal transform and a vertical transform, and includes DST-7 or DCT-8; performing an inverse-transform on the current block based on the transform combination; and reconstructing the video signal by using the inverse-transformed current block.

In the present disclosure, the performing the inverse transform includes, if the horizontal transform or the vertical transform is DST-7, applying Winograd FFT algorithm when an input N is a prime number, and applying Prime Factor FFT algorithm when the input N is not a prime number.

In the present disclosure, the performing the inverse transform includes, if the horizontal transform or the vertical transform is DCT-8, performing multiplications of N-times on an input having length N; performing a DST-6 operation of (2N+1) length by using Winograd FFT; and outputting DST-8 inverse-transform kernel by performing addition operation of (N−1) times.

In the present disclosure, the performing the inverse transform includes, if the vertical transform is DST-7 or DCT-8, applying the DST-7 or DCT-8 inverse-transform on each of columns; and identifying whether the horizontal transform is DST-7 or DCT-8.

In the present disclosure, if the horizontal transform is DST-7 or DCT-8 according to the identification, the performing the inverse transform comprises applying the DST-7 or DCT-8 inverse-transform on each of rows.

In the present disclosure, the transform combination index is transmitted with a transform unit.

The present disclosure provides an apparatus for processing a video signal using a linear relationship between transform types, which includes: determining a transform group based on a prediction of a current block; parsing a transform combination index from the video signal, wherein the transform combination index indicates one of a plurality of transform combinations in the transform group; deriving a transform combination corresponding to the transform combination index, wherein the transform combination is composed of a horizontal transform and a vertical transform, and includes DST-7 or DCT-8; performing an inverse-transform on the current block based on the transform combination; and a reconstruction unit configured to reconstruct the video signal by using the inverse-transformed current block, in which the transform combination is composed of a horizontal transform and a vertical transform, and includes DST-7 or DCT-8.

In the present disclosure, if the horizontal transform or the vertical transform is DST-7, the inverse-transform unit is configured to: apply Winograd FFT algorithm when an input N is a prime number; and apply Prime Factor FFT algorithm when the input N is not a prime number.

In the present disclosure, if the horizontal transform or the vertical transform is DCT-8, the inverse-transform unit is configured to: perform multiplications of N-times on an input having length N; perform a DST-6 operation of (2N+1) length by using Winograd FFT; and output DST-8 inverse-transform kernel by performing (N−1) times of addition operation.

In the present disclosure, if the vertical transform is DST-7 or DCT-8, the inverse-transform unit is configured to apply the DST-7 or DCT-8 inverse-transform on each of columns; and identify whether the horizontal transform is DST-7 or DCT-8.

In the present disclosure, if the horizontal transform is DST-7 or DCT-8 according to the identification, the inverse-transform unit is configured to apply the DST-7 or DCT-8 inverse-transform on each of rows.

MODE FOR INVENTION

Hereinafter, constructions and operations according to embodiments of the present disclosure are described with reference to the accompanying drawings. The constructions and operations of the present disclosure described with reference to the drawings are described as only embodiments, and the technical spirit and core components of the present disclosure are not restricted by the constructions and operations.

Furthermore, common terms that are now widely used are selected as terms used in the present disclosure, but terms randomly selected by the applicant are used in specific cases. In such a case, a corresponding term should not be interpreted based on only the name of a term used in the description of the present disclosure because the meaning of the corresponding term is clearly described in the detailed description of a corresponding part, but should be interpreted by checking even the meaning of the corresponding term.

Furthermore, terms used in the present disclosure are common terms selected to describe the disclosure, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting and division may be properly replaced and interpreted in each coding process.

FIG. 1 is an embodiment to which the present disclosure may be applied, and shows a schematic block diagram of an encoder in which the encoding of a video signal is performed.

Referring to FIG. 1, the encoder 100 may be configured to include a picture partition unit 110, a transform unit 120, a quantization unit 130, a inverse quantization unit 140, an inverse transform unit 150, a filtering unit 160, a decoded picture buffer (DPB) 170, an inter prediction unit 180, an intra prediction unit 185, and an entropy encoder 190.

The picture partition unit 110 may divide an input image (or, picture, frame), input to the encoder 100, into one or more processing units. For example, the processing unit may be a coding tree unit (CTU), a coding unit (CU), a prediction unit (PU) or a transform unit (TU).

However, the terms are merely used for convenience of description for the present disclosure, and the present disclosure is not limited to the definition of a corresponding term. Furthermore, in the present disclosure, for convenience of description, a video signal is used as a unit used in a process of encoding or decoding a video signal, but the present disclosure is not limited thereto and a video signal may be properly interpreted based on invention contents.

The encoder 100 may generate a residual signal by subtracting a prediction signal, output from the inter prediction unit 180 or the intra prediction unit 185, from the input image signal. The generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure. The transform unit 120 may perform the following embodiments.

The present disclosure provides a low-complexity computation algorithm having a length of N by using a Cooley-Turkey algorithm and a Rader algorithm for an FFT computation.

The present disclosure provides a method of using the Cooley-Turkey algorithm and the Rader algorithm for FFT-9, FFT-17, FFT-33, FFT-65, and FFT-129 computations based on a fact that DST-7 having a length of N has a relationship with FFT having a length of (2N+1).

The present disclosure provides a low-complexity computation algorithm of a DCT-8 transform kernel by using the relationship between DCT-8 and DST-7.

Detailed embodiments thereof will be described in more detail in the present disclosure.

The quantization unit 130 may quantize the transform coefficient and transmit it to the entropy encoder 190. The entropy encoder 190 may entropy-code the quantized signal and output it as a bitstream.

The quantized signal output from the quantization unit 130 may be used to generate a prediction signal. For example, the quantized signal may reconstruct a residual signal by applying dequantization and inverse transform through the inverse quantization unit 140 and the inverse transform unit 150 within a loop. A reconstructed signal may be generated by adding the reconstructed residual signal to the prediction signal output from the inter prediction unit 180 or the intra prediction unit 185.

Meanwhile, artifacts in which a block boundary is viewed may occur by a quantization error occurred in the compression process. Such a phenomenon is called blocking artifacts, which are one of important factors to evaluate picture quality. In order to reduce such artifacts, a filtering process may be performed. Picture quality can be improved by removing blocking artifacts and also reducing an error of a current picture through such a filtering process.

The filtering unit 160 applies filtering to the reconstructed signal and outputs the filtered signal to a playback device or transmits the filtered signal to the decoded picture buffer 170. The filtered signal transmitted to the decoded picture buffer 170 may be used as a reference picture in the inter prediction unit 180. As described above, not only picture quality, but coding efficiency can be improved using the filtered picture as a reference picture in an interframe prediction mode.

The decoded picture buffer 170 may store the filtered picture in order to use it as a reference picture in the inter prediction unit 180.

The inter prediction unit 180 performs temporal prediction and/or spatial prediction in order to remove temporal redundancy and/or spatial redundancy with reference to a reconstructed picture. In this case, the reference picture used to perform prediction may include blocking artifacts or ringing artifacts because it is a signal transformed through quantization and dequantization in a block unit upon coding/decoding before.

Accordingly, the inter prediction unit 180 may interpolate a signal between pixels in a subpixel unit by applying a lowpass filter in order to solve performance degradation attributable to the discontinuity or quantization of a signal. In this case, the subpixel means a virtual pixel generated by applying an interpolation filter, and an integer pixel means an actual pixel present in a reconstructed picture. Linear interpolation, bi-linear interpolation or a Wiener filter may be applied as an interpolation method.

The interpolation filter may be applied to a reconstructed picture to improve the precision of prediction. For example, the inter prediction unit 180 may generate an interpolation pixel by applying the interpolation filter to an integer pixel, and may perform prediction using an interpolated block configured with interpolated pixels as a prediction block.

The intra prediction unit 185 may predict a current block with reference to surrounding samples of a block on which encoding is to be now performed. The intra prediction unit 185 may perform the following process in order to perform intra prediction. First, a reference sample necessary to generate a prediction signal may be prepared. Furthermore, a prediction signal may be generated using the prepared reference sample. Thereafter, a prediction mode is encoded. In this case, the reference sample may be prepared through reference sample padding and/or reference sample filtering. The reference sample may include a quantization error because it has experienced a prediction and reconstruction process. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

FIG. 2 is an embodiment to which the present disclosure may be applied, and shows a schematic block diagram of a decoder in which the decoding of a video signal is performed.

Referring to FIG. 2, the decoder 200 may be configured to include a parsing unit (not shown), an entropy decoding unit 210, an inverse quantization unit 220, an inverse transform unit 230, a filtering unit 240, a decoded picture buffer (DPB) 250, an inter prediction unit 260, an intra prediction unit 265.

Further, a reconstructed video signals outputted from the decoder 200 may be played by a playback device.

The decoder 200 may receive a signal output from the encoder 100 of FIG. 1, and the received signal may be entropy-decoded through the entropy decoding unit 210.

The inverse quantization unit 220 obtains a transform coefficient from the entropy-decoded signal using quantization step size information.

The inverse transform unit 230 obtains a residual signal by inverse-transforming the transform coefficient. Here, the present disclosure may provide a method for applying DST-7 or DCT-8 to which a low-complexity algorithm is applied to a row or a column and the embodiments described in the present disclosure may be applied. In addition, the embodiments described in the encoder may also be applied to the decoder.

A reconstructed signal is generated by adding the obtained residual signal and a prediction signal outputted from the inter predictor 260 or the intra predictor 265.

The filtering unit 240 applies filtering to the reconstructed signal and outputs the filtered signal to a playback device or transmits the filtered signal to the decoded picture buffer 250. The filtered signal transmitted to the decoded picture buffer 250 may be used as a reference picture in the inter predictor 260.

In the present disclosure, the transform unit 120 of the encoder 100 and embodiments described in each of functional units described may be applied in each of inverse transform unit 230 of the decoder and corresponding functional units.

FIG. 3 is a table showing a transform configuration group to which Adaptive Multiple Transforms (AMT) is applied as an embodiment to which the present disclosure is applied.

Referring to FIG. 3, the transform configuration groups may be determined based on the prediction mode and the number of groups may be a total of six groups G0 to G5. G0 to G4 represent transform combinations (or transform sets or transform combination sets) applied to the residual block generated by the intra prediction and G5 represents transform combinations (or transform sets and transform combination sets) applied to the residual block generated by the inter prediction.

One transform combination may be constituted by a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and transmitted by encoding the transform combination index from the encoder to the decoder.

As an embodiment, the residual data (or residual signal) obtained through the intra prediction may have different statistical characteristics according to the intra prediction mode. Therefore, as illustrated in FIG. 3, transforms other than a general cosine transform may be applied to each intra prediction mode. In the present disclosure, the transform type may be expressed as, for example, DCT-Type 2, DCT-II, DCT2, or DCT-2.

Referring to FIG. 3, a case of using 35 intra prediction modes and a case of using 67 intra prediction modes are illustrated. A plurality of transform combinations may be applied to each transform configuration group divided in each intra prediction mode column. For example, the plurality of transform combinations may be constituted by four (row direction transforms and column direction transforms) combinations. As a specific example, DST-7 and DST-5 may be applied in a row (horizontal) direction and a column (vertical) direction in group 0, and as a result, a total of four combinations are available.

Since a total of transform kernel combinations may be applied to each intra prediction mode, a transform combination index for selecting one of the transform kernel combinations may be transmitted every transform unit. In the present disclosure, the transform combination index may be called AMT index and expressed as amt_idx.

Further, in addition to the transform kernels presented in FIG. 3 above, a case where DCT-2 is optimal for both the row direction and the column direction due to characteristics of the residual signal may occur. Accordingly, the AMT flag is defined for each coding unit to adaptively perform the transform. Here, when the AMT flag is 0, DCT-2 may be applied to both the row direction and the column direction and when the AMT flag is 1, one of four combinations may be selected or determined through the AMT index.

As an embodiment, when the AMT flag is 1, if the number of non-zero transform coefficients for one transform unit is smaller than 3, the DST-7 may be applied both the row direction and the column direction is not applied without applying the transform kernels of FIG. 3.

As an embodiment, when the AMT flag is 0, if the number of non-zero transform coefficients is smaller than 3, by first parsing the transform coefficient values, the amount of additional information transmission may be reduced by applying the DST-7 without parsing the AMT index.

As an embodiment, the AMT may be applied only when both a width and a height of the transform unit is equal to or smaller than 32.

As an embodiment, FIG. 3 may be preconfigured through off-line training.

As an embodiment, the AMT index may be defined as one index which may simultaneously indicate the horizontal transform and the vertical transform. Alternatively, the AMT index may be separately defined as a horizontal transform index and a vertical transform index.

FIG. 4 is a flowchart showing an encoding process in which Adaptive Multiple Transforms (AMT) is performed as an embodiment to which the present disclosure is applied.

In the present disclosure, an embodiment in which transforms are a separately applied to the horizontal direction and the vertical direction is basically described, but the transform combination may be configured as non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 3 may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform group corresponding to the current block (S410). Here, the transform group may mean the transform group of FIG. 3 and the present disclosure is not limited thereto and the transform configuration group may be constituted by other transform combinations.

The encoder may perform a transform for candidate transform combinations usable in the transform group (S420).

As a result of performing the transform, the encoder may determine or select a transform combination having smallest rate distortion (RD) cost (S430).

The encoder may encode the transform combination index corresponding to the selected transform combination (S440).

FIG. 5 is a flowchart showing a decoding process in which Adaptive Multiple Transforms (AMT) is performed as an embodiment to which the present disclosure is applied.

First, the decoder may determine the transform group for the current block (S510).

The decoder may parse the transform combination index and here, the transform combination index may correspond to any one of the plurality of transform combinations in the transform group (S520).

The decoder may derive the transform combination corresponding to the transform combination index (S530). Here, the transform combination may mean the transform combination described in FIG. 3, but the present disclosure is not limited thereto. That is, the decoder may be configured by another transform combination.

The decoder may perform the inverse transform for the current block based on the transform combination (S540). When the transform combination is constituted by the row transform and the column transform, the column transform may be applied after applying the row transform first. However, the present disclosure is not limited thereto and the transform order may be reversed or when the transform combination is constituted by the non-separable transforms, the non-separable transform may be immediately applied.

On the other hand, as another embodiment, a process of determining the transform group and a process of parsing the transform combination index may be performed at the same time.

(Embodiment 1) Low-Complexity Computation Method of DST-7

FIG. 6 is a block diagram illustrating a process of applying Winograd FFT having a prime length of N for a DST-7 low-complexity computation as an embodiment to which the present disclosure is applied.

Overview of DST-7

DST-7 may be used with respect to a 4×4 block size (N=4) in intra prediction and furthermore, may be used even with respect to all prediction modes and transform block sizes in order to acquire higher compression performance. A DST-7 transform kernel is defined as shown in Equation 1.

$$[S_N^{VII}]_{n,k} = \frac{2}{\sqrt{2N+1}} \sin\left(\frac{\pi(2k+1)(n+1)}{2N+1}\right) \quad \text{[Equation 1]}$$

Here, N means an input length, i.e., the size of the transform block. When the transform kernel for DST-7 is calculated by a direct matrix computation, multiplication of $N^2$ and addition of $N \times (N-1)$ with respect to the N×N transform kernel, and as a result, higher complexity is required. A relational expression between DST-7 and DFT may be used to reduce the computational complexity and, a low-complexity computation may be performed with respect to the DST-7 transform kernel of N=4 and 8 by using a fact that a Winograd FFT algorithm may reduce the computational complexity with respect to FFT having a small length.

Low-Complexity Computation Technique for DST-7

The low-complexity computation may be performed with respect to DST-7 having all lengths N of the transform kernel by using the Cooley-Tukey algorithm and the Rader algorithm for the FFT computation. However, efficiency may deteriorate in terms of complexity as compared with the Winograd FFT algorithm. In the Winograd FFT algorithm, the computation may be performed with considerably fewer multiplications with respect to FFT of a length for the power of a prime value.

Accordingly, the present disclosure proposes a method for performing the low-complexity computation with respect to the DST-7 transform kernel having all lengths N by using the Winogard FFT algorithm for the FFT computation. To this end, the DST-7 transform kernel may be decomposed by using the relational expression with DFT as shown in Equation 2.

$$S_N^{VII} = \frac{1}{2} R \, \Im[F_{2N+1}]QP \quad \text{[Equation 2]}$$

Here, $S_N^{VII}$ represents the DST-7 transform kernel acquired through a matrix decomposition, $\Im[F_{2N+1}]$ represents a Winograd FFT computation having a length of 2N+1, and R represents a matrix having a size of N×(2N−1), and this is calculated as shown in Equation 3.

$$[R]_{n,k} = \begin{cases} 1, & \text{if } k = n+1 \quad n, k = 1, 3, \ldots, N-1 \\ -1, & \text{if } k = n+1 \quad n, k = 0, 2, \ldots, N-2 \\ 0, & \text{otherwise} \end{cases} \quad \text{[Equation 3]}$$

In addition, Q represents a matrix having a size of (2N×1)×N and this is calculated as shown in Equation 4.

$$Q = \begin{pmatrix} 0^T \\ I_N \\ -J_N \end{pmatrix} \quad \text{[Equation 4]}$$

In addition, P represents a permutation matrix and this is calculated as shown in Equation 5.

$$[P]_{n,k} = \quad \text{[Equation 5]}$$
$$\begin{cases} 1, & \text{if } k+1 = 2(n+1), \quad n = 0, 1, \ldots, N/2-1 \\ 1, & \text{if } k+1 = 2(2N-n)-1, \quad n = N/2, \ldots, N-1 \\ 0, & \text{otherwise} \end{cases}$$

Referring to Equation 2 above, DST-7 having the length of N has a relationship with DFT having the length of (2N+1). Accordingly, the low-complexity calculation technique for FFT-9, FFT-17, FFT-33, FFT-65, and FFT-129 computations may be calculated through the FFT algorithm with respect to transform blocks 4×4, 8×8, 16, 16, and 32×32.

Referring to FIG. 6 above, a process of Winograd FFT may be regarded as multiplication of three matrixes and this may be expressed as shown in Equation 6.

$$y_N = A_{1,N} M_N A_{2,N} x_N \qquad \text{[Equation 6]}$$

Here, $x_N$ and $y_N$ mean an input and an output having the length of N, respectively. In addition, in FIG. 6 above, matrixes $A_{1,N}$ and $A_{2,N}$ having a trapezoidal shape includes only 0 or ±1 and thus include only an additional computation.

Further, in FIG. 6 above, a matrix $M_N$ having a rectangular shape has a non-zero value only in a diagonal term and N or less multiplications are actually required. Accordingly, DFT having all prime-number lengths may well use an advantage of the Winograd FFT.

FIG. 7 is a block diagram illustrating a process of applying Prime Factor FFT having a length of N for a DST-7 low-complexity computation as an embodiment to which the present disclosure is applied.

The Winograd FFT may apply the FFT to the prime number length, otherwise may not apply the FFT. For example, when the block size is 16×16, Winograd FFT having a length of 2N+1=33 is applied for the DST-7 computation, but 33 is not the prime number, and as a result, in the present disclosure, a prime factor FFT algorithm may be applied. That is, the prime factor FFT algorithm may be applied to DFT for a case where the length N is $N_1$ $N_2$ and $N_1$ and $N_2$ are coprimes. In this case, as illustrated in FIG. 7 above, the DFT for the length N may be obtained by dividing the DFT into the DFT for the length $N_1$ and the DFT for the length $N_2$.

FIGS. 8 and 9 are diagrams illustrating a process of performing a DST-7 low-complexity computation for N=16 and 32 by using Winograd FFT and Prime Factor FFT as embodiments to which the present disclosure is applied.

The low-complexity computation for N=16 and 32 may be expressed as shown in FIGS. 8 and 9 by using the Winograd FFT and prime factor FFT algorithms.

FIGS. 8 and 9 above illustrate embodiments of computations for N=16 and N=32, respectively. In FIG. 8 above, a left long box 33 is a block in which an input length N (=16) is extended to 2N+1 (=33) and in this case, the computation is performed by using matrixes Q and P of Equations 4 and 5 above.

In addition, 33 (=11×3) may be computed by using 3 FFTs having a length of 11 by using the Prime Factor FFT algorithm. In this case, each of the FFTs having the length of 11 may be computed by using the Winograd FFT.

Next, a middle long box 33 serves to connect 11 Winograd FFTs receiving a length of 3 again. Here, each of the Winograd FFTs having the length of 3 is performed 11 times. Outputs of 11 Winograd FFTs are rearranged by using Equation 3 above to generate a total of 16 outputs.

FIG. 9 above illustrates a DST-7 computation having a length of 32 which may be applied to 32×32 blocks. Similarly to the case having the length of 16, since N(=32) is extended to a length of 2N+1 (=65) and 65 may be expressed by multiplication of prime numbers 13 and 5, a total of 5 Winograd FFTs having an input with the length of 13 and a total of 13 Winograd FFTs having an input with the length of 5 are sequentially computed. Hereinafter, a duplicated description will be omitted and the aforementioned contents may be applied.

As another embodiment, the present disclosure provides an integer computation method through integer approximation.

Since transform encoding should be calculated with all integers in order to avoid a mismatch between the encoder and the decoder, computation techniques proposed by the present disclosure should be transformed into an integer computation and performed. Among the proposed computation techniques, there is multiplication in which a part to be changed to an integer becomes a real number. For example, multiplication for real numbers a and b may be expressed by an approximate expression for an integer value as shown in Equation 7 below.

$$a \times b \cong \frac{c}{2^p} \qquad \text{[Equation 7]}$$

Here, c and p are integers and p as a factor for determining how accurate to perform approximation may be selected by considering trade-off of between accuracy and complexity. Closest c satisfying Equation 7 above may be found and used for an actual computation. Further, in Equation 7 above, since division includes a lot of computation amounts, the division may be replaced with integer and shift computation and expressed as shown in Equation 14 below.

$$(c+2^{P-1}) \gg p \qquad \text{[Equation 8]}$$

In this case, since a computation divided by a power of 2 is easily possible by the shift computation, the computation may be expressed as above and becomes a suitable computation even in hardware. A real-number computation may be approximate by such a method and c and p may be selected by considering an approximation error and complexity.

In the present disclosure, approximate values for coefficients used for the Winograd FFT or coefficients computed in a linear relationship may be expressed as shown in Table 1 below. The coefficients presented in Table 1 above may be numbers selected by considering the approximation error, the complexity depending on the multiplication, the block size, and quantization and may be changed according to a condition.

TABLE 1

| Kernels | Lengths | Processing | Integer values | Norms |
|---|---|---|---|---|
| Forward and Inverse DST-VII | 4 | FFT9 | −296, −117, −336, −219 | 512 |
| | 8 | FFT17 | −317, −152, 234, −212, −130, 171, 84, −547, 232, −50, 84, −17, −814, 277, 1352, −457, 1434, −520, −5, −130, 68 | 724 |
| | 16 | FFT3 FFT11 | −887, −1536 196, 59, 92, 168, 252, 153, 8, 69, 91, 191, 99, 221, 37, 67, 9, 117, 113, 193, 146, 76, 178 | 1024 |
| | 32 | FFT5 FFT13 | 974, −1576, −372, 572, −1280 195, 54, 135, 72, 103, 94, 93, 1, 77, 27, 104, 207, 163, 147, 215, 155, 199, 8, 8, 52, 180 | 1448 |

(Embodiment 2) Low-complexity computation method of DCT-8

FIGS. 10 and 11 are a graph and a flowchart of performing a low-complexity computation of forward DCT-8 for a length of N as embodiments to which the present disclosure is applied.

Overview of DCT-8

The transform kernel of DCT-8 is defined as shown in Equation 9.

$$[C_N^{VII}] = \frac{2}{\sqrt{2(N-1)}} \cos\left(\frac{\pi(2n+1)(2k+1)}{4N-2}\right) \quad \text{[Equation 9]}$$

When the transform kernel of DCT-8 is calculated by the direct matrix computation, high complexity of multiplication of $N^2$ and addition of $N \times (N-1)$ with respect to the $N \times N$ transform kernel is required, and as a result, a method for performing the low-complexity computation is required. Accordingly, the present disclosure proposes a method for performing a low-complexity computation of a transform kernel for DCT-8 by using the relationship between DCT-8 and DST-7.

Low-Complexity Computation Technique for DCT-8

By the same method as the transform kernel for DST-7, the low-complexity computation technique for N=4, 8, 16, 32, ... is required. The transform kernel relationship between DCT-8 and DST-7 is shown in Equations 10 to 13 below.

$$C_N^{VII} = D_{DCT\text{-}VII} \cdot D_{DST\text{-}VII}^{-1} \cdot S_N^{VII} \cdot A \quad \text{[Equation 10]}$$

$$D_{DCTVII} = \text{diag}\left\{\cos\left(\left(k+\frac{1}{2}\right)\frac{\pi}{2N+1}\right)\right\} \quad \text{[Equation 11]}$$

$$D_{DSTVII} = \text{diag}\left\{\sin\left(\left(k+\frac{1}{2}\right)\frac{\pi}{N+1/2}\right)\right\} \quad \text{[Equation 12]}$$

$$A = \begin{bmatrix} 1 & -1 & & & & \\ & 1 & -1 & & & \\ & & \ddots & \ddots & & \\ & & & \ddots & \ddots & \\ & & & & 1 & -1 \\ & & & & & 1 \end{bmatrix} \quad \text{[Equation 13]}$$

Here, when N means an input length (here, N of the block size N×N) and X is assumed as an input vector, the computation first performed in Equation 10 above becomes AX. As defined in Equation 13 above, the multiplication computation for A may be simply performed only by the addition and the subtraction.

In addition, a subsequent computation $S_N^{VII} \cdot A$ may be simply by using the Winograd FFT like the low-complexity computation of DST-7.

Further, since $D_{DCT\text{-}VIII}$ and $D_{DST\text{-}VII}^{-1}$ are diagonal matrixes including only diagonal elements as defined in Equations 11 and 12, $D_{DCT\text{-}VIII} \cdot D_{DST\text{-}VII}^{-1}$ becomes a scale factor for each element of $S_N^{VII} \cdot A$.

Accordingly, as shown in Equations 10 to 13 above, the transform kernel of DCT-8 may be obtained only by additional addition and multiplication for the transform kernel of DST-7. For example, multiplication of additional N and addition of (N−1) are required with respect to the N×N transform kernel.

The low-complexity computation technique for forward transform of DCT-8 proposed by the present disclosure may be described by FIGS. 10 and 11.

FIGS. 10 and 11 above show a graph and a flowchart of performing a low-complexity computation of forward DCT-8 for a length of N.

Referring to FIG. 10 above, a preprocessing process corresponding to matrix A is performed for the input with the length of N. The preprocessing process may be performed with very small addition and subtraction computation complexity because elements of matrix A are constituted only by 1 and −1. Here, N may become 4, 8, 16, 32, 64, 128, etc., which are the same as the block size.

Next, the DST-7 computation having (2N+1) point may be performed. The process may be performed with low complexity by using the Winograd FFT and Prime Factor algorithms.

In addition, a part corresponding to $D_{DCT\text{-}VIII} \cdot D_{DST\text{-}VII}^{-1}$ may output a result by multiplexing each element by the coefficient.

Referring to FIG. 11 above, a process of performing the low-complexity computation of forward DCT-8 for the length N is described below.

First, the addition of (N−1) times may be performed for the input having the length of N (S1110).

In addition, the DST-7 computation having the length of (2N+1) may be performed by using the Winograd FFT and Prime Factor algorithms (S1120).

Thereafter, N multiplication computations are performed (S1130) to output the DCT-8 transform kernel (S1140).

FIG. 12 is an internal block diagram of an apparatus of performing a low-complexity computation of DCT-8 and DST-7 as an embodiment to which the present disclosure is applied.

As in FIG. 10, even in FIG. 12, in the present disclosure, before and after DST-7 (S1220), the multiplication computation for matrix A may be expressed by a preprocessing step (S1210) and a scaling multiplication step by $D_{DCT\text{-}VIII} \cdot D_{DST\text{-}VII}^{-1}$ may be expressed by an "N multiplication" step (S1230).

That is, the transform kernel of DCT-8 may be obtained only by additional addition and multiplication for the transform kernel of DST-7. In particular, it can be seen that multiplication of additional N and addition of (N−1) are required with respect to the N×N transform kernel. Since DCT-8 may be implemented only addition and multiplication computations having an additional low-complexity computation for the computation for DST-7 as described above, integrated implementation illustrated in FIG. 12 is possible.

As illustrated in FIG. 12 above, the forward transform may be implemented by using a module of DST-7 at the time of the DCT-8 computation without implementing a separate apparatus for the DCT-8 computation. That is, the coefficients of DCT-8 may be obtained only an additional computation after and before DST-7 (S1220).

FIGS. 13 and 14 are a graph and a flowchart of performing a low-complexity computation of backward DCT-8 for a length of N as embodiments to which the present disclosure is applied.

Like the forward transform, the low-complexity computation may be performed in a similar method even in inverse transform and this may be expressed as illustrated in FIG. 13. As illustrated in FIGS. 13 and 14, in the case of the inverse transform, the computation may be performed in an opposite direction to the forward transform.

This corresponds to a computation for $(C_N^{VIII})^{-1}$ in Equation 10 and first, since $(D_{DCT\text{-}VIII} \cdot D_{DST\text{-}VII}^{-1})^{-1}$ is multiplication of diagonal matrixes, the multiplication computation of N for each element is performed. This is expressed as preprocessing in FIG. 13 above. Second, a DST-6 low-complexity computation having the input of (2N+1) may be performed. DST-7 and DST-6 have a relationship of an inverse relationship as shown in Equation 14 below.

$$S_N^{VI}=(s_N^{VII})^{-1}$$ [Equation 14]

Here, DST-6 may be computed by using the relationship shown in Equation 15.

$$S_N^{VI}=\tfrac{1}{2}R\,\Im[F_{2N+1}]QP$$ [Equation 15]

Here, $S_N^{VI}$ represents a DST-6 kernel obtained through the matrix decomposition, $\Im[F_{2N+1}]$ represents the Winograd FFT computation having the length of 2N+1, and R represents a matrix having the size of N×(2N+1), and this is calculated as shown in Equation 16.

$$[R]_{n,k} = \begin{cases} 1, & \text{if } k=n+1 \quad n,k=1,3,\ldots,N-1 \\ -1, & \text{if } k=n+1 \quad n,k=0,2,\ldots,N-2 \\ 0, & \text{otherwise} \end{cases}$$ [Equation 16]

Here, Q represents a matrix computation having a size of (2N×1)×N and this is calculated as shown in Equation 17.

$$Q = \begin{pmatrix} 0^T \\ I_N \\ -J_N \end{pmatrix}$$ [Equation 17]

Here, I represents an identity matrix, J represents a reversal matrix, P represents a permutation matrix, and this is calculated as shown in Equation 18.

$$[P]_{n,k} = \begin{cases} 1 & \text{if } k=N-1-n \\ 0 & \text{otherwise} \end{cases} \text{ for}$$ [Equation 18]

$$n = 0, 1, \ldots, N-1$$

It can be seen that similarly to DST-7, even in the DST-6 computation, the low-complexity computation is available by using the Winograd FFT through Equation 15. That is, the low-complexity calculation technique for FFT-9, FFT-17, FFT-33, FFT-65, and FFT-129 computations may be calculated through the Winograd FFT algorithm with respect to transform blocks 4×4, 8×8, 16, 16, and 32×32. In this case, since 33 and 65 are not the prime numbers and may be decomposed to the prime numbers of 11×3 and 15×3, the computation may be performed by using the Prime Factor FFT algorithm.

In addition, the computation corresponding to the $A^{-1}$ multiplication is performed with respect to a computed result. FIG. 13 above illustrates an inverse DCT-8 computation process for the length of N.

There is a method that may reduce the numbers of additions and multiplications by using the FFT through a flow graph of the computation, but further reduce by using symmetry of the input of the FFT. Half of the FFT of the input is equal to a value of an original input and the remaining half is equal to a negative value of the original input and the remaining one is 0. Accordingly, when such a property, even though the calculation is performed only for the half input of the FFT, the remaining result value may be predicted and the computational amount may be more significantly reduced by using the predicted result value.

Referring to FIG. 14 above, the flowchart for describing the inverse DCT-8 computation process for the length of N is illustrated.

First, the multiplication of N times may be performed for the input having the length of N (S1410).

In addition, the DST-6 computation having the length of (2N+1) may be performed by using the Winograd FFT (S1420).

Thereafter, (N−1) multiplication computations are performed (S1430) to output the inverse DCT-8 transform kernel (S1440).

As another embodiment, the present disclosure provides an integer computation method through integer approximation. The embodiment and Equations 7 and 8 described in FIG. 9 above may be applied and the duplicated description will be omitted.

In the present disclosure, approximate values for coefficients used for the Winograd FFT or coefficients computed in the linear relationship may be expressed as shown in Table 2 below. The coefficients presented in Table 2 above may be numbers selected by considering the approximation error, the complexity depending on the multiplication, the block size, and quantization and may be changed according to a condition.

TABLE 2

| Kernels | Lengths | Processing | Integer values | Norms |
|---|---|---|---|---|
| Forward and Inverse DST-VII | 4 | Post-processing | 1474, 512, 334, 272 | 512 |
| | 8 | Post-processing | 5549, 1871, 1149, 850, 693, 602, 549, 521 | 724 |
| | 16 | Post-processing | 10760, 3598, 2172, 1565, 1233, 1024, 883, 782, 707, 651, 609, 576, 552, 534, 521, 514 | 1024 |
| | 32 | Post-processing | 21189, 7068, 4248, 3041, 2373, 1949, 1657, 1444, 1282, 1155, 1054, 970, 901, 843, 794, 752, 715, 684, 657, 633, 612, 594, 578, 565, 553, 543, 534, 527, 522, 517, 514, 513 | 1448 |
| Inverse DCT-8 | 4 | Preprocessing | 356, 1024, 1569, 1924 | 512 |
| | 8 | Preprocessing | 189, 560, 913, 1234, 1513, 1741, 1910, 2013 | 724 |
| | 16 | Preprocessing | 97, 291, 483, 670, 851, 1024, 1188, 1341, 1482, 1610, 1723, 1820, 1901, 1965, 2011, 2039 | 1024 |
| | 32 | Preprocessing | 49, 148, 247, 345, 442, 538, 633, 726, 818, 908, 995, 1081, 1163, 1243, 1321, 1395, 1466, 1533, 1597, 1657, 1713, 1765, 1813, 1857, 1897, 1932, 1962, 1988, 2010, 2027, 2038, 2046 | 148 |

TABLE 2-continued

| Kernels | Lengths | Processing | Integer values | Norms |
|---|---|---|---|---|
| | 16 | Post-processing | 130, 185, 188, 183, 200, 210, 224, 242, 267, 300, 348, 418, 530, 734, 1215, 3631 | 1024 |
| | 32 | Post-processing | 129, 183, 183, 183, 186, 188, 191, 194, 198, 203, 208, 214, 221, 229, 238, 249, 261, 276, 293, 313 ,313, 365, 400, 444, 499, 573, 674, 820, 1051, 1467, 2441, 7318 | 1448 |

FIG. 15 is an internal block diagram of an apparatus of performing backward transform by using a relationship between DCT-8 and DST-7 as an embodiment to which the present disclosure is applied.

Similar to the case of the forward transform of FIG. 12 described above, the inverse transform may be implemented by using the module of DST-6 at the time of the computation of DCT-8 without implementing a separate apparatus for the DCT-8 computation. As illustrated in FIG. 15 above, the coefficients of DCT-8 may be obtained only an additional computation after and before DST-6.

Referring to FIG. 15 above, in the present disclosure, before and after DST-6 (S1520), a scaling multiplication step by $D_{DST-VII}^{-1} \cdot D_{DCT-VIII}$ may be expressed by a scaling multiplication step (S1510) and a multiplication computation for matrix $A^{-1}$ may be expressed by a post-processing step (S1530).

FIG. 16 is a flowchart for describing a process of encoding an AMT flag and an AMT index as an embodiment to which the present disclosure is applied.

The encoder may determine whether the Adaptive Multiple Transforms (AMT) is applied to the current block (S1610).

When the Adaptive Multiple Transforms (AMT) is applied, the encoder may encode AMT flag=1 (S1620).

In addition, the encoder may determine the AMT index based on at least one of the prediction mode, the horizontal transform, and the vertical transform of the current block (S1630). Here, the AMT index may mean an index indicating any one of the plurality of transform combinations for each intra prediction mode and the AMT index may be transmitted for each transform unit.

When the AMT index is determined, the encoder may encode the AMT index (S1640).

On the other hand, when the Adaptive Multiple Transforms (AMT) is not applied, the encoder may encode AMT flag=0 (S1650).

FIG. 17 is a flowchart for describing an encoding process of applying DST-7 or DCT-8 to a row or a column as an embodiment to which the present disclosure is applied.

The present disclosure provides a method for reducing computation for Discrete Sine Transform-7 (DST-7) or Discrete Cosine Transform-8 (DCT-8) among transform kernels for video compression.

First, the encoder may determine whether the AMT is applied and this may be determined by the AMT flag. Here, the AMT flag may indicate whether the Adaptive Multiple Transforms (AMT) is applied to the current block. For example, the encoder may check whether AMT flag=1 (S1710). When AMT flag=1, AMT flag of 1 indicates that AMT is applied and when AMT flag=0, AMT flag of 0 indicates that the AMT is not applied.

When AMT flag=1, it may be checked whether the horizontal transform is DST-7 or DCT-8 (S1720).

When the horizontal transform is DST-7 or DCT-8, the encoder may apply DST-7 or DCT-8 every row so as to perform the low-complexity computation according to the embodiments of the present disclosure (S1730).

When the horizontal transform is not DST-7 and DCT-8, the encoder may apply transform other than DST-7 and DCT-8 every row (S1740).

Thereafter, the encoder may check whether the vertical transform is DST-7 or DCT-8 (S1750).

When the vertical transform is DST-7 or DCT-8, the encoder may apply DST-7 or DCT-8 every row so as to perform the low-complexity computation according to the embodiments of the present disclosure (S1760). Even in this case, the aforementioned low-complexity algorithm may be applied.

When the vertical transform is not DST-7 and DCT-8, the encoder may apply transform other than DST-7 and DCT-8 every column (S1770).

Meanwhile, when AMT flag=0, the encoder may apply the horizontal transform every row (S1780). In addition, the encoder may apply the vertical transform every column (S1790). For example, the horizontal transform and the vertical transform may be DCT-2.

FIG. 18 is a flowchart for describing a decoding process in which horizontal transform or vertical transform is applied to a row or a column based on an AMT flag and an AMT index as an embodiment to which the present disclosure is applied.

The decoder may parse the AMT flag from the bitstream (S1810). Here, the AMT flag may indicate whether the Adaptive Multiple Transforms (AMT) is applied to the current block.

The decoder may determine whether the Adaptive Multiple Transforms (AMT) is applied to the current block based on the AMT flag (S1820). For example, it may be checked whether the AMT flag is 1.

When the MTS flag is 1, the decoder may parse the AMT index (S1830). Here, the AMT index may mean an index indicating any one of the plurality of transform combinations for each intra prediction mode and the AMT index may be transmitted for each transform unit. Alternatively, the AMT index may mean an index indicating any one transform combination defined in a preconfigured transform combination table and here, the preconfigured transform combination table may mean FIG. 3, but the present disclosure is limited thereto.

The decoder may derive or determine the horizontal transform and the vertical transform based on at least one of the AMT index and the prediction mode (S1840).

Alternatively, the decoder may derive the transform combination corresponding to the AMT index. For example, the decoder may derive or determine the horizontal transform and the vertical transform corresponding to the AMT index.

Meanwhile, when the AMT flag is 0, the transform kernel preconfigured by the encoder or decoder may be used. For example, the transform kernel that is not defined in the transform combination table illustrated in FIG. 3, but another transform kernel may be used.

FIG. 19 is a flowchart for describing a decoding process of applying DST-7 or DCT-8 to a row or a column as an embodiment to which the present disclosure is applied.

The present disclosure provides a method for reducing computation for Discrete Sine Transform-7 (DST-1) or Discrete Cosine Transform-8 (DCT-8) among transform kernels for video compression.

The decoder may parse the AMT flag from the bitstream. Here, the AMT flag may indicate whether the Adaptive Multiple Transforms (AMT) is applied to the current block.

The decoder may determine whether the Adaptive Multiple Transforms (AMT) is applied to the current block based on the AMT flag. For example, it may be checked whether the AMT flag is 1 (S1900).

When the AMT flag is 1, the decoder may derive or determine the horizontal transform and the vertical transform based on at least one of the AMT index and the prediction mode (S1910).

In this case, the decoder may check whether the vertical transform is DST-7 or DCT-8 (S1920).

When the vertical transform is DST-7 or DCT-8, the decoder may apply DST-7 or DCT-8 inverse transform every column so as to perform the low-complexity computation according to the embodiments of the present disclosure (S1930 and S1940).

Meanwhile, when the vertical transform is not DST-7 and DCT-8, the decoder may apply inverse transform other than DST-7 and DCT-8 every column (S1950).

Thereafter, the decoder may check whether the horizontal transform is DST-7 or DCT-8 (S1960).

When the horizontal transform is DST-7 or DCT-8, the decoder may apply DST-7 or DCT-8 inverse transform every row so as to perform the low-complexity computation according to the embodiments of the present disclosure (S1970 and S1980). Even in this case, the aforementioned low-complexity algorithm may be applied.

When the horizontal transform is not DST-7 and DCT-8, the decoder may apply inverse transform other than DST-7 and DCT-8 every row (S1990).

Meanwhile, when the AMT flag is 0, the decoder may apply vertical inverse transform for each column (S1901). For example, the vertical inverse transform may be DCT-2 inverse transform.

In addition, the decoder may apply horizontal inverse transform for each row (S1902). For example, the horizontal inverse transform may be inverse transform of DCT-2. That is, when the AMT flag is 0, the transform kernel preconfigured by the encoder or decoder may be used. For example, the transform kernel that is not defined in the transform combination table illustrated in FIG. 3, but another transform kernel may be used.

FIG. 20 is a structure diagram of a content streaming system as an embodiment to which the present disclosure is applied.

Referring to FIG. 20, the content streaming system to which the present disclosure is applied may largely include an encoding server, a streaming server, a web server, a media storage, a user device, and a multimedia input device.

The encoding server compresses contents input from multimedia input devices including a smartphone, a camera, a camcorder, etc., into digital data to serve to generate the bitstream and transmit the bitstream to the streaming server. As another example, when the multimedia input devices including the smartphone, the camera, the camcorder, etc., directly generate the bitstream, the encoding server may be omitted.

The bitstream may be generated by the encoding method or the bitstream generating method to which the present disclosure is applied and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD), etc., and the like.

Each server in the content streaming system may be operated as a distributed server and in this case, data received by each server may be distributed and processed.

As described above, the embodiments described in the present disclosure may be implemented and performed on a processor, a micro processor, a controller or a chip. For example, the function units shown in each of drawings may be implemented and performed on a computer, a processor, a micro processor, a controller, or a chip.

Furthermore, the decoder and the encoder to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, over the top (OTT) video device, an Internet streaming service provision device, a three-dimensional (3D) video device, a video telephony device, and a medical video device, and may be used to process a video signal or a data signal. For example, over the top (OTT) video device may comprise a game console, a blu-ray player, Internet access TV, home theater system, smartphone, tablet PC, digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices and distribution storage devices in which computer-readable data is stored. The computer-readable recording medium may include Blueray disk (BD), a universal serial bus (USB), ROM, PROM, EPROM, EEPROM, RAM, CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

In addition, the embodiment of the present disclosure may be implemented as a computer program product by a program code, which may be performed on the computer by the embodiment of the present disclosure. The program code may be stored on a computer-readable carrier.

INDUSTRIAL APPLICABILITY

The above-described preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:

1. A method for processing a video signal, comprising:
   determining, by a processor, a prediction mode of a current block;
   parsing, by the processor, a transform combination index corresponding to one of a plurality of transform combinations from the video signal based on the prediction mode;
   deriving, by the processor, a transform combination corresponding to the transform combination index, wherein the transform combination is composed of a horizontal transform and a vertical transform, and includes DST-7 or DCT-8;
   performing, by the processor, an inverse-transform on the current block based on the transform combination; and
   reconstructing, by the processor, the video signal by using the inverse-transformed current block.

2. The method of claim 1, wherein, if the horizontal transform or the vertical transform is DST-7, the performing of the inverse transform comprises:
   applying Winograd FFT algorithm when an input N is a prime number, and applying Prime Factor FFT algorithm when the input N is not a prime number.

3. The method of claim 1, wherein, if the horizontal transform or the vertical transform is DCT-8, the performing of the inverse transform comprises:
   performing multiplications of N-times on an input having length N;
   performing a DST-6 operation of (2N+1) length by using Winograd FFT; and
   outputting DST-8 inverse-transform kernel by performing addition operation of (N-1) times.

4. The method of claim 1, wherein, if the vertical transform is DST-7 or DCT-8, the performing of the inverse transform comprises:
   applying the DST-7 or DCT-8 inverse-transform on each of columns; and
   identifying whether the horizontal transform is DST-7 or DCT-8.

5. The method of claim 4, wherein, if the horizontal transform is DST-7 or DCT-8 according to the identification, the performing of the inverse transform comprises applying the DST-7 or DCT-8 inverse-transform on each of rows.

6. The method of claim 1, wherein the transform combination index is transmitted with a transform unit.

7. An apparatus for processing a video signal using a linear relationship between transform types, comprising:
   a memory configured to store the video signal; and
   a processor coupled to the memory,
   wherein the processor is configured to:
   determine a prediction mode of a current block;
   parse a transform combination index indicating one of a plurality of transform combinations from the video signal based on the prediction mode;
   derive a transform combination corresponding to the transform combination index;
   perform an inverse-transform on the current block based on the transform combination; and
   reconstruct the video signal by using the inverse-transformed current block,
   wherein the transform combination is composed of a horizontal transform and a vertical transform, and includes DST-7 or DCT-8.

8. The apparatus of claim 7, wherein, if the horizontal transform or the vertical transform is DST-7, the processor is configured to:
   apply Winograd FFT algorithm when an input N is a prime number; and
   apply Prime Factor FFT algorithm when the input N is not a prime number.

9. The apparatus of claim 7, wherein, if the horizontal transform or the vertical transform is DCT-8, the processor is configured to:
   perform multiplications of N-times on an input having length N;
   perform a DST-6 operation of (2N+1) length by using Winograd FFT; and
   output DST-8 inverse-transform kernel by performing (N-1) times of addition operation.

10. The apparatus of claim 7, wherein, if the vertical transform is DST-7 or DCT-8, the processor is configured to
    apply the DST-7 or DCT-8 inverse-transform on each of columns; and
    identify whether the horizontal transform is DST-7 or DCT-8.

11. The apparatus of claim 10, wherein, if the horizontal transform is DST-7 or DCT-8 according to the identification, the processor is configured to apply the DST-7 or DCT-8 inverse-transform on each of rows.

12. The apparatus of claim 7, wherein the transform combination index is transmitted with a transform unit.

* * * * *